(12) United States Patent
Yamanoi et al.

(10) Patent No.: US 10,648,910 B2
(45) Date of Patent: May 12, 2020

(54) OPTICAL ANALYSIS DEVICE AND OPTICAL ANALYSIS METHOD

(71) Applicant: KONICA MINOLTA, INC., Chiyoda-ku (JP)

(72) Inventors: Yuta Yamanoi, Toyonaka (JP); Tomomi Setoguchi, Chigasaki (JP); Yoshitaka Teraoka, Suita (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/095,263

(22) PCT Filed: Apr. 19, 2017

(86) PCT No.: PCT/JP2017/015719
§ 371 (c)(1),
(2) Date: Oct. 19, 2018

(87) PCT Pub. No.: WO2017/188085
PCT Pub. Date: Nov. 2, 2017

(65) Prior Publication Data
US 2019/0293560 A1    Sep. 26, 2019

(30) Foreign Application Priority Data

Apr. 27, 2016   (JP) .................................. 2016-088732

(51) Int. Cl.
*G01N 21/57*   (2006.01)
*G01J 3/02*    (2006.01)
(Continued)

(52) U.S. Cl.
CPC ............... *G01N 21/57* (2013.01); *C09D 5/36* (2013.01); *C09D 201/00* (2013.01);
(Continued)

(58) Field of Classification Search
CPC .... G01N 21/57; G01N 21/251; G01N 21/956; G01N 21/95607; G01N 21/95684;
(Continued)

(56) References Cited

U.S. PATENT DOCUMENTS 5,583,642 A * 12/1996 Nakazono ................. G01J 3/50
356/405
2011/0234621 A1    9/2011 Steenhoek
(Continued)

FOREIGN PATENT DOCUMENTS

JP    2003-279413    10/2003
JP    2003-294622    10/2003
(Continued)

OTHER PUBLICATIONS

Kunststoffe International, "Magazine for Plastics", www.kunststoffe-international.com, © Carl Hanser Verlag, Munich, vol. 102, Apr. 2012.

(Continued)

*Primary Examiner* — Christina A Riddle
(74) *Attorney, Agent, or Firm* — Cozen O'Connor

(57) ABSTRACT

A difference between a peak reflectance of a first wavelength component and a reflectance of a second wavelength component having a predetermined wavelength among reflectances of a plurality of wavelength components constituting reflected light in a highlight direction from a glitter material-containing coating film is set as a first difference value. Reflectance is measured of the first and second wavelength components of the reflected light in the highlight direction for the coating film corresponding to a measurement object. A first difference value is calculated by using the measurement result. A storage stores in advance correlation information indicating a correlation between the first difference value and an index value indicating predetermined physical (Continued)

characteristics of a glitter material contained in the coating film. An index value calculator calculates the index value of the coating film corresponding to the measurement object by using the correlation information and the first difference value calculated in the first calculator.

12 Claims, 20 Drawing Sheets

(51) Int. Cl.

| | | |
|---|---|---|
| *G01J 3/50* | (2006.01) | |
| *G01N 21/25* | (2006.01) | |
| *G01N 21/956* | (2006.01) | |
| *C09D 201/00* | (2006.01) | |
| *C09D 5/36* | (2006.01) | |
| *G01N 21/84* | (2006.01) | |

(52) U.S. Cl.
 CPC ............... *G01J 3/0278* (2013.01); *G01J 3/50* (2013.01); *G01J 3/504* (2013.01); *G01N 21/251* (2013.01); *G01N 21/95607* (2013.01); *G01N 2021/575* (2013.01); *G01N 2021/8427* (2013.01); *G01N 2021/95615* (2013.01)

(58) Field of Classification Search
 CPC ......... G01N 21/25–256; G01N 21/274; G01N 2021/95615; G01N 21/5911; G01N 21/55; G01N 21/9501; G01N 21/94; G01N 21/27; G01N 2021/575; G01N 2021/8427; G01N 21/8422; G01J 3/504; G01J 3/0278; G01J 3/46; G01J 3/52; G01J 3/501; G01J 3/502; G01J 3/524; G01J 3/50; C09D 5/32; C09D 201/00
 USPC .......... 356/237.1–237.5, 300, 319, 320, 337, 356/402, 407, 408, 445–448, 600, 601, 356/612
 See application file for complete search history.

(56) References Cited

U.S. PATENT DOCUMENTS

| | | | | |
|---|---|---|---|---|
| 2012/0162665 | A1* | 6/2012 | Hamamatsu | ......... G01B 11/303 356/600 |
| 2014/0055787 | A1* | 2/2014 | Teraoka | .................. G01J 3/504 356/402 |
| 2014/0078293 | A1* | 3/2014 | Beymore | ................. G01J 3/504 348/135 |
| 2015/0147566 | A1* | 5/2015 | Nakano | ................... B60R 13/00 428/329 |

FOREIGN PATENT DOCUMENTS

| | | |
|---|---|---|
| JP | 2011-227098 | 11/2011 |
| JP | 2012-233764 | 11/2012 |
| JP | 2014-042892 | 3/2014 |
| JP | 2014-193938 | 10/2014 |
| JP | 2015-529832 | 10/2015 |
| WO | WO 2012/147488 | 11/2012 |

OTHER PUBLICATIONS

Mr. Werner Rudolf Cramer, Optical Properties of Interference Pigments—Solutions to the Problem of their Description & Characterisation, China Coatings Journal, pp. 40-47, Mar. 2012.

* cited by examiner

OPTICAL ANALYSIS DEVICE AND OPTICAL ANALYSIS METHOD

RELATED APPLICATIONS

This is a U.S. National Phase Application under 35 USC 371 of International Application PCT/JP2017/015719 filed on Apr. 19, 2017.

This application claims the priority of Japanese application no. 2016-088732 filed Apr. 27, 2016, the entire content of which is hereby incorporated by reference.

TECHNICAL FIELD

The present invention relates to a technique of evaluating a glitter material-containing coating film.

BACKGROUND ART

A glitter material-containing coating film is a coating film which is formed on a coating object by applying a paint containing a particulate glitter material (for example, a metallic paint or a pearl paint) onto the coating object. The glitter material-containing coating film has different viewing characteristics (for example, color or texture) depending on a viewing direction and a wavelength of illuminated light due to a change of light reflected on a surface of the glitter material. A technique relating to these characteristics will be introduced.

As a technique of evaluating the texture of the glitter material-containing coating film, Patent Literature 1 and Patent Literature 2 disclose a technique of evaluating the texture of metallic paint color.

In the case of colorimetric measurement of the glitter material-containing coating film using a colorimeter, the above-described characteristics cannot be evaluated even when reflected light is measured from one light receiving angle. For this reason, there is a need to measure the reflected light from a plurality of light receiving angles. As such a colorimeter, Patent Literature 3 discloses a multi-angle colorimeter.

As one factor that affects the above-described characteristics of the glitter material-containing coating film, the reflectance of the glitter material-containing coating film is known. Regarding this, Non-Patent Literature 1 reports that the reflectance of the glitter material-containing coating film changes in response to the wavelength and the change becomes different in response to geometry (FIG. 6 of Non-Patent Literature 1).

When describing the geometry in detail, for example, the geometry of 45°: 0° means a relationship in which a light incident angle of illuminated light is 45° and an observation angle of light reflected from a sample surface is 0° (that is, the direction of the reflected light matches the normal direction) based on a normal line of the sample surface.

Non-Patent Literature 2 reports that a peak of a reflectance of a titanium dioxide film shifts to a long wavelength as a thickness of the titanium dioxide film (the titanium dioxide is a kind of glitter material) increases (FIG. 4 of Non-Patent Literature 2).

The reflectance of the glitter material-containing coating film becomes different in response to an index value indicating physical characteristics of the glitter material (for example, roughness of the glitter material) contained in the glitter material-containing coating film. Thus, the index value affects the above-described characteristics. When the index value is given, it is possible to evaluate the above-described characteristics of the glitter material-containing coating film.

CITATION LIST

Patent Literature

Patent Literature 1: JP 2003-279413 A
Patent Literature 2: JP 2011-227098 A
Patent Literature 3: JP 2012-233764 A

Non-Patent Literature

Non-Patent Literature 1: "Kunststoffe international magazine for plastics" published by Carl Hanser Verlag, April 2012, Volume 102, p. 11-16
Non-Patent Literature 2: "Optical Properties of Interference Pigments-Solutions to the Problem of their Description & Characterisation" written by Werner Rudolf Cramer, CHINA COATINGS JOURNAL, March 2012, p. 40-47

SUMMARY OF INVENTION

An object of the invention is to provide an optical analysis device and an optical analysis method capable of obtaining an index value indicating physical characteristics of a glitter material contained in a glitter material-containing coating film.

Solution to Problem

An optical analysis device according to a first aspect of the invention that achieves the above-described object includes a measurement part, a first calculator, a storage, and an index value calculator. A difference between a peak reflectance of a first wavelength component and a reflectance of a second wavelength component having a predetermined wavelength among reflectances of a plurality of wavelength components constituting reflected light in a highlight direction from a glitter material-containing coating film is set as a first difference value. The measurement part measures the reflectance of the first wavelength component and the reflectance of the second wavelength component of the reflected light in the highlight direction for the glitter material-containing coating film corresponding to a measurement object. The first calculator calculates the first difference value by using the measurement result of the measurement part. The storage stores in advance correlation information illustrating a correlation between the first difference value and an index value indicating predetermined physical characteristics of a glitter material contained in the glitter material-containing coating film and capable of obtaining the index value from the first difference value. The index value calculator calculates the index value of the glitter material-containing coating film corresponding to the measurement object by using the first difference value calculated in the first calculator and the correlation information stored in advance in the storage.

These and other objects, features, and advantages of the invention will become apparent from the following detailed description and the accompanying drawings.

DESCRIPTION OF EMBODIMENTS

A multi-angle colorimeter according to an embodiment has a function of an optical analysis device and can acquire data correlated with an index value indicating physical characteristics of a particulate glitter material contained in a glitter material-containing coating film. As the index value, for example, (1) the roughness of the glitter material (in other words, the size or particle diameter), (2) the area of the glitter material, (3) the thickness of the glitter material, (4) the number of layers of the glitter material, (5) the glitter material distribution degree, the glitter material distribution regularity, and the glitter material distribution randomness in the horizontal direction and the vertical direction of the glitter material-containing coating film along with the glitter material orientation degree, the glitter material orientation regularity, and the glitter material orientation randomness in the horizontal direction and the vertical direction, (6) the concentration of the glitter material in the glitter material-containing coating film, and (7) the glitter material overlapping state of the glitter material-containing coating film are exemplified.

In the embodiment, the roughness of the glitter material will be described as an example of the index value. The roughness of the glitter material is a particle diameter of the glitter material contained in the glitter material-containing coating film.

The multi-angle colorimeter according to the embodiment calculates a predetermined correlation equation (an example of correlation information) using the correlated data and stores the correlation equation in advance. Then, the multi-angle colorimeter according to the embodiment calculates the index value indicating the physical characteristic of the glitter material contained in the glitter material-containing coating film for the glitter material-containing coating film corresponding to a measurement object by using the correlation equation.

In this way, the multi-angle colorimeter according to the embodiment obtains the predetermined correlation equation used to calculate the index value in advance and calculates the index value using the correlation equation.

Figure 1:
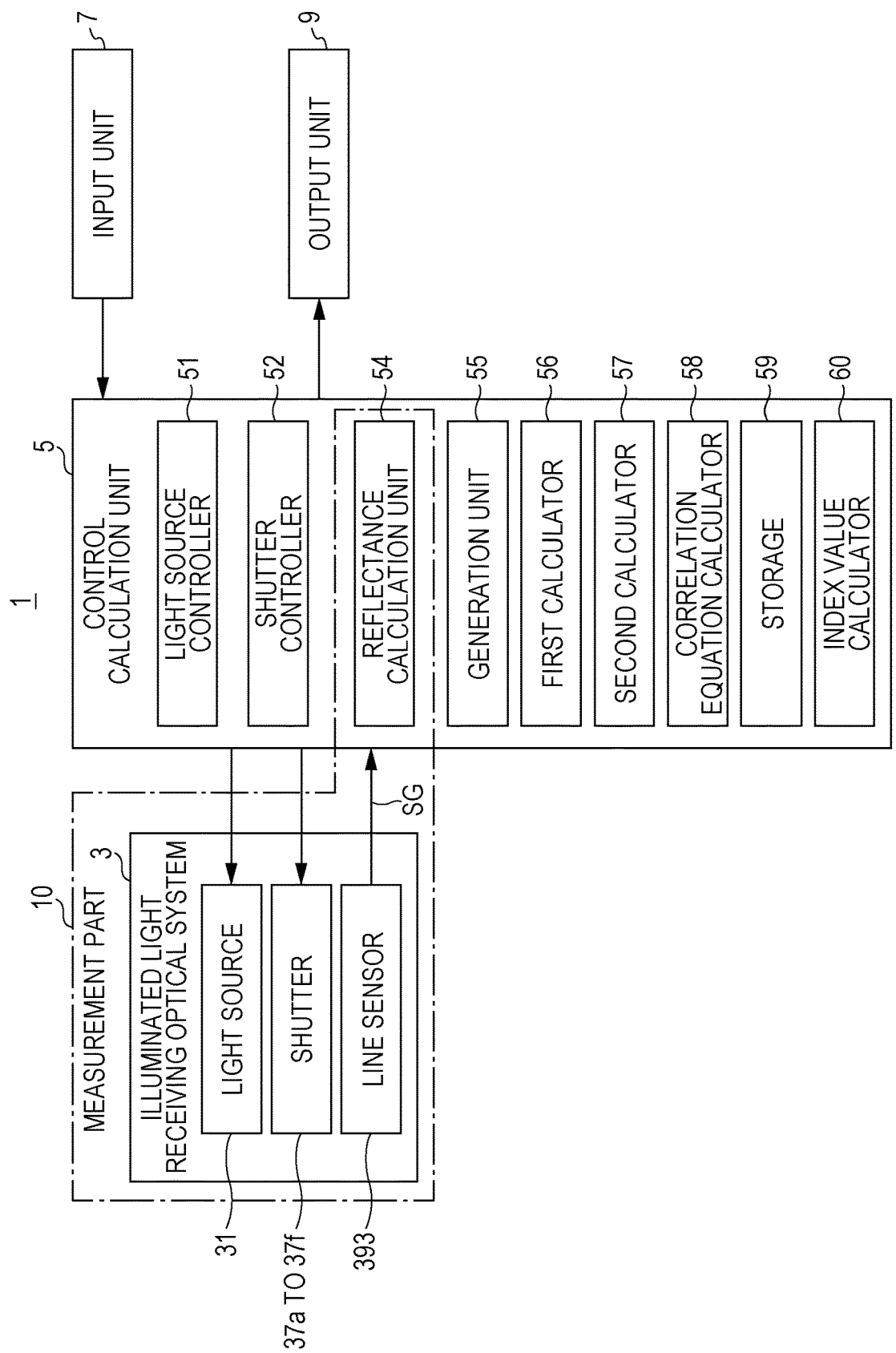
FIG. 1 is a block diagram illustrating a configuration of a multi-angle colorimeter according to an embodiment.

Hereinafter, embodiments of the invention will be described in detail with reference to the drawings. FIG. 1 is a block diagram illustrating a configuration of a multi-angle colorimeter 1 according to the embodiment. The multi-angle colorimeter 1 has a function of an optical analysis device. The multi-angle colorimeter 1 includes an illuminated light receiving optical system 3, a control calculation unit 5, an input unit 7, and an output unit 9.

Figure 2:
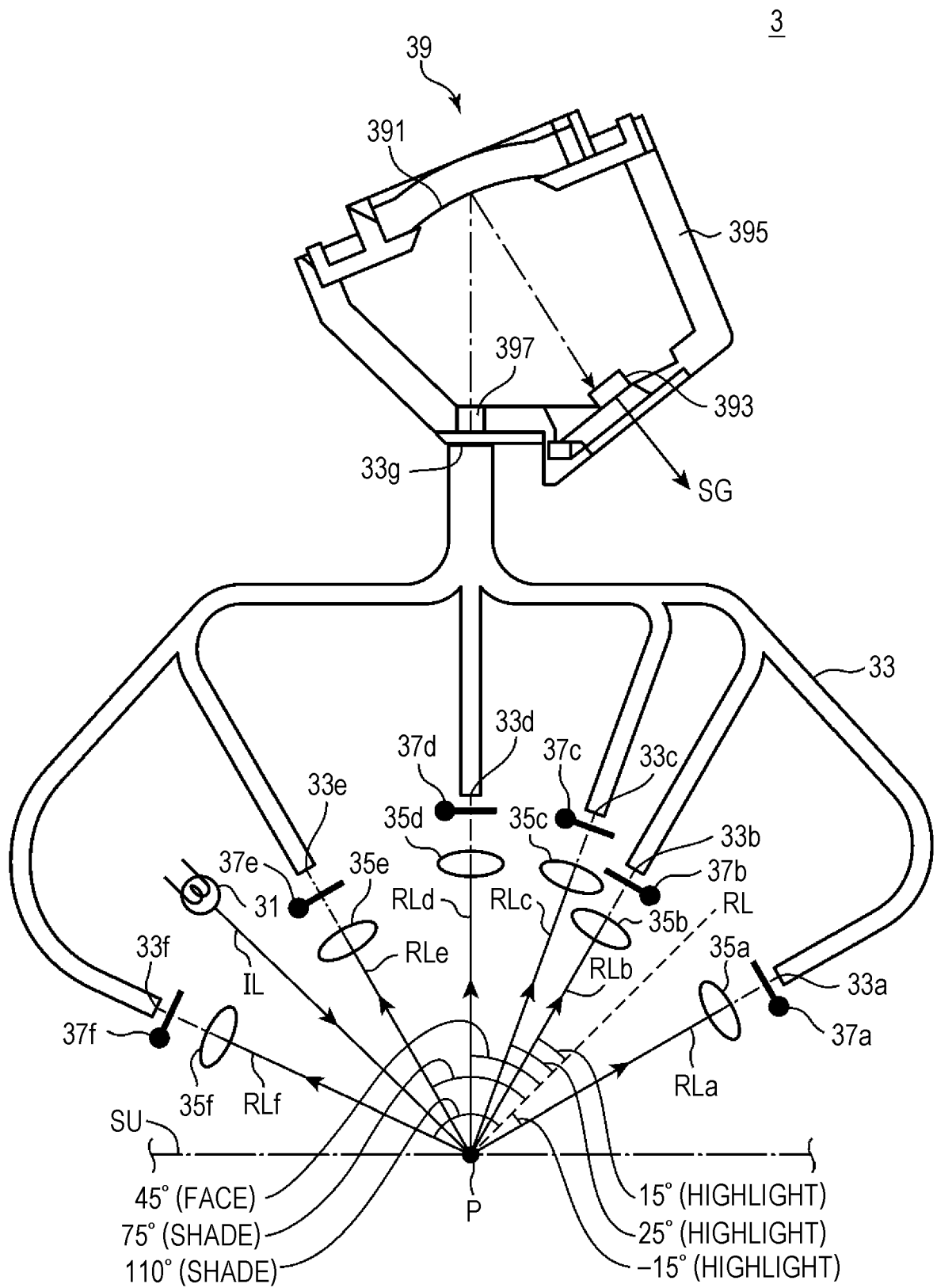
FIG. 2 is a schematic diagram illustrating a configuration of an illuminated light receiving optical system illustrated in FIG. 1.

FIG. 2 is a schematic diagram illustrating a configuration of the illuminated light receiving optical system 3. The illuminated light receiving optical system 3 constitutes an illumination optical system and a light receiving optical system of the multi-angle colorimeter 1 and includes a light source 31, a bundle fiber 33, light receiving lenses 35a to 35f, shutters 37a to 37f, and a polychromator 39.

The light source 31 emits illuminated light IL. The illuminated light IL is reflected at a predetermined position (a measurement point P) of the glitter material-containing coating film so that reflected light (for example, positive reflected light RL and reflected lights RLa to RLf) is generated. The light incident angle of the illuminated light IL is set to 45° with respect to a normal line of a surface SU (a sample surface) of the glitter material-containing coating film.

The reflected light RLa of the aspecular angle of −15°, the reflected light RLb of the aspecular angle of 15°, the reflected light RLc of the aspecular angle of 25°, the reflected light RLd of the aspecular angle of 45°, the reflected light RLe of the aspecular angle of 75°, and the reflected light RLf of the aspecular angle of 110° correspond to the measurement objects. The aspecular angle indicates an angle in which a clockwise direction for the light receiving angle of the positive reflected light RL is minus and a counter-clockwise direction for the light receiving angle is plus when the light receiving angle is 0°.

Regarding the aspecular angle, the direction of the angle smaller than 45° is set as the highlight direction, the direction of 45° is set as the face direction, and the direction of the angle larger than 45° is set as the shade direction.

The bundle fiber 33 includes six light incident ends 33a to 33f and one light emission end 33g. The reflected lights RLa to RLf respectively incident to six light incident ends 33a to 33f are emitted from the light emission end 33g.

The light receiving lens 35a, the shutter 37a, and the light incident end 33a are disposed on the optical path of the reflected light RLa. The light receiving lens 35b, the shutter 37b, and the light incident end 33b are disposed on the optical path of the reflected light RLb. The light receiving lens 35c, the shutter 37c, and the light incident end 33c are disposed on the optical path of the reflected light RLc. The light receiving lens 35d, the shutter 37d, and the light incident end 33d are disposed on the optical path of the reflected light RLd. The light receiving lens 35e, the shutter 37e, and the light incident end 33e are disposed on the optical path of the reflected light RLe. The light receiving lens 35f, the shutter 37f, and the light incident end 33f are disposed on the optical path of the reflected light RLf.

Hereinafter, the shutter 37a will be described as an example, but the shutters 37b to 37f also have the same functions as that of the shutter 37a. In a state in which the shutter 37a is opened, the reflected light RLa passes through the light receiving lens 35a and the shutter 37a and is incident to the light incident end 33a. In a state in which the shutter 37a is closed, the reflected light RLa passes through the light receiving lens 35a, but cannot be incident to the light incident end 33a due to the interruption of the shutter 37a.

The polychromator 39 includes a diffraction grating 391, a line sensor 393, and a casing 395 accommodating these components. The casing 395 is provided with a light incident slit 397. The light incident slit 397 faces the light emission end 33g of the bundle fiber 33. The reflected light (any one of the reflected lights RLa to RLf) emitted from the light emission end 33g is separated by the diffraction grating 391 while passing through the light incident slit 397. The line sensor 393 receives the separated light and outputs a light receiving signal SG. The light receiving signal SG is transmitted to the control calculation unit 5 illustrated in FIG. 1.

Referring to FIG. 1, the control calculation unit 5 is a microcomputer which is realized by a central processing unit (CPU), a random access memory (RAM), and a read only memory (ROM) and includes a light source controller 51, a shutter controller 52, a reflectance calculation unit 54, a generation unit 55, a first calculator 56, a second calculator 57, a correlation equation calculator 58, a storage 59, and an index value calculator 60 as function blocks.

Referring to FIGS. 1 and 2, the light source controller 51 controls the on/off state of the light source 31.

The shutter controller 52 controls the open/close states of the shutters 37a to 37f. When the reflected light RLa is sent to the polychromator 39, control is performed such that the shutter 37a is opened and the other shutters 37b to 37f are closed. Accordingly, the reflected light RLa is sent to the polychromator 39 through the bundle fiber 33 and the reflected light RLa is separated by the diffraction grating 391 and is received by the line sensor 393. The line sensor 393 outputs the light receiving signal SG generated by receiving the reflected light RLa.

When the reflected light RLb is sent to the polychromator 39, control is performed such that the shutter 37b is opened and the other shutters 37a and 37c to 37f are closed. Accordingly, the reflected light RLb is sent to the polychromator 39 through the bundle fiber 33 and the reflected light RLb is separated by the diffraction grating 391 and is received by the line sensor 393. The line sensor 393 outputs the light receiving signal SG generated by receiving the reflected light RLb.

When the reflected light RLc is sent to the polychromator 39, control is performed such that the shutter 37c is opened and the other shutters 37a, 37b, and 37d to 37f are closed. Accordingly, the reflected light RLc is sent to the polychromator 39 through the bundle fiber 33 and the reflected light RLc is separated by the diffraction grating 391 and is received by the line sensor 393. The line sensor 393 outputs the light receiving signal SG generated by receiving the reflected light RLc.

When the reflected light RLd is sent to the polychromator 39, control is performed such that the shutter 37d is opened and the other shutters 37a to 37c, 37e, and 37f are closed. Accordingly, the reflected light RLd is sent to the polychromator 39 through the bundle fiber 33 and the reflected light RLd is separated by the diffraction grating 391 and is received by the line sensor 393. The line sensor 393 outputs the light receiving signal SG generated by receiving the reflected light RLd.

When the reflected light RLe is sent to the polychromator 39, control is performed such that the shutter 37e is opened and the other shutters 37a to 37d and 37f are closed. Accordingly, the reflected light RLe is sent to the polychromator 39 through the bundle fiber 33 and the reflected light RLe is separated by the diffraction grating 391 and is received by the line sensor 393. The line sensor 393 outputs the light receiving signal SG generated by receiving the reflected light RLe.

When the reflected light RLf is sent to the polychromator 39, control is performed such that the shutter 37f is opened and the other shutters 37a to 37e are closed. Accordingly, the reflected light RLf is sent to the polychromator 39 through the bundle fiber 33 and the reflected light RLf is separated by the diffraction grating 391 and is received by the line sensor 393. The line sensor 393 outputs the light receiving signal SG generated by receiving the reflected light RLf.

The input unit 7 is a device that inputs a command (instruction) or data from the outside to the multi-angle colorimeter 1 and is realized by a keyboard. In addition, a touch panel may be used as the input unit 7. The output unit 9 is a device that outputs a command or data input from the input unit 7 and a calculation result of the control calculation unit 5 and is realized by a display. In addition, a printing apparatus such as a printer may be used as the output unit 9.

The reflectance calculation unit 54, the generation unit 55, the first calculator 56, and the second calculator 57 are used to acquire data correlated with the roughness of the glitter material. The reflectance calculation unit 54 calculates the reflectance of the measurement point P at the aspecular angle of −15° by using the light receiving signal SG generated by the reflected light RLa in the case of the white calibration plate having existing reflectance and the light receiving signal SG generated by the reflected light RLa in the case of the glitter material-containing coating film corresponding to the measurement object, calculates the reflectance of the measurement point P at the aspecular angle of 15° by using the light receiving signal SG generated by the reflected light RLb in the case of the white calibration plate and the light receiving signal SG generated by the reflected light RLb in the case of the glitter material-containing coating film, calculates the reflectance of the measurement point P at the aspecular angle of 25° by using the light receiving signal SG generated by the reflected light RLc in the case of the white calibration plate and the light receiving signal SG generated by the reflected light RLc in the case of the glitter material-containing coating film, calculates the reflectance of the measurement point P at the aspecular angle of 45° by using the light receiving signal SG generated by the reflected light RLd in the case of the white calibration plate and the light receiving signal SG generated by the reflected light RLd in the case of the glitter material-containing coating film, calculates the reflectance of the measurement point P at the aspecular angle of 75° by using the light receiving signal SG generated by the reflected light RLe in the case of the white calibration plate and the light receiving signal SG generated by the reflected light RLe in the case of the glitter material-containing coating film, and calculates the reflectance of the measurement point P at the aspecular angle of 110° by using the light receiving signal SG generated by the reflected light RLf in the case of the white calibration plate and the light receiving signal SG generated by the reflected light RLf in the case of the glitter material-containing coating film.

The reflectance calculation unit 54 and the illuminated light receiving optical system 3 constitute a measurement part 10. The measurement part 10 measures the reflectance for each of the plurality of wavelength components constituting the reflected light reflected from the glitter material-containing coating film. In the reflected light reflected from the glitter material-containing coating film, the reflected lights RLa to RLf of the aspecular angles of −15°, 15°, 25°, 45°, 75°, and 110° correspond to the measurement objects. The measurement part 10 performs the above-described measurement for each of cases in which the roughness of the glitter material is different (for example, the roughness of 2, the roughness of 4, the roughness of 5, and the roughness of 6).

As described above, on the assumption that the measurement of the reflectance for each of a plurality of wavelength components constituting the reflected light in the highlight direction reflected from the glitter material-containing coating film is set as a first measurement, the measurement part 10 performs the first measurement for each of cases in which the roughness of the glitter material contained in the glitter material-containing coating film is different. Further, on the assumption that the measurement of the reflectance for each of a plurality of wavelength components constituting the reflected light in the shade direction reflected from the glitter material-containing coating film is set as a second measurement, the measurement part 10 performs the second measurement for each of cases in which the roughness of the glitter material contained in the glitter material-containing coating film is different. In addition, the first measurement and the second measurement for one sample (for example, the glitter material-containing coating film of the roughness of 2) may be performed during one measurement sequence from the start to the end of the measurement of the reflectance.

The generation unit 55 generates a graph indicating a relationship between the plurality of wavelength components and the reflectance by using the result measured by the measurement part 10. The generation unit 55 performs the above-described generation for each of cases in which the roughness of the glitter material is different. A first graph and a second graph are included in the graph. The first graph is a graph indicating a relationship between the plurality of wavelength components and the reflectance for the reflected light in the highlight direction. The second graph is a graph indicating a relationship between the plurality of wavelength components and the reflectance for the reflected light in the shade direction. In the present specification, the graph is not limited to a drawing indicating a relationship between the plurality of wavelength components and the reflectance, but may be an equation indicating such a relationship.

The first calculator 56 calculates a first difference value by setting a difference between a reflectance of a first wavelength component in which the reflectance becomes a peak value and a reflectance of a second wavelength component which has a predetermined wavelength as the first difference value in the first graph. The first calculator 56 calculates the first difference value for each of cases in which the roughness of the glitter material is different.

Further, the first calculator 56 calculates a second difference value by setting a difference between the reflectance of the first wavelength component and the reflectance of the second wavelength component as a second difference value in the second graph. The first calculator 56 calculates the second difference value for each of cases in which the roughness of the glitter material is different.

The second calculator 57 calculates a third difference value by setting a difference between a first value determined by using the first difference value and a second value determined by using the second difference value as the third difference value. The second calculator 57 calculates the third difference value for each of cases in which the roughness of the glitter material is different. The third difference value is, for example, a value expressed by the following equation.

$$\text{Third difference value} = \frac{(\text{First difference value of } As\text{ -15°} + \text{First difference value of } As\text{ 15°})}{2} - \text{Second difference value} \qquad [\text{Math. 1}]$$

The first value is an average value of the difference between the first difference value at the aspecular angle of −15° (As −15) and the first difference value at the aspecular angle of 15° (As 15). The second value is the second difference value at the aspecular angle of 75°.

The inventor has found that the first difference value is correlated with the roughness of the glitter material. Thus, the first difference value calculated for each of cases in which the roughness of the glitter material is different becomes data correlated with the roughness of the glitter material. Further, the inventor has found that the third difference value is correlated with the roughness of the glitter material. Thus, the third difference value calculated for each of cases in which the roughness of the glitter material is different becomes data correlated with the roughness of the glitter material. The correlation means the tendency that the other part (the first difference value or the third difference value) decreases or increases when one value (the index value) increases.

The data correlated with the roughness of the glitter material will be described in detail with reference to a first example and a second example. The first example is for the glitter material-containing coating film formed by using blue paint. Blue pearl is used as the glitter material. The roughness of the glitter material is indicated by seven levels of the roughness of 1 to the roughness of 7. As the numerical value increases, the glitter material becomes finer. Thus, the glitter material is finest in the case of the roughness of 7.

As a sample of the glitter material-containing coating film, a sample of roughness of 2, a sample of roughness of 4, a sample of roughness of 5, and a sample of roughness of 6 were used. The sample of the roughness of 2 is the glitter material-containing coating film formed by using blue paint containing the glitter material of the roughness of 2. Similarly, the sample of the roughness of 4, the sample of the roughness of 5, and the sample of the roughness of 6 are respectively the glitter material-containing coating films formed by using blue paint containing the glitter material of the roughness of 4, the glitter material of the roughness of 5, and the glitter material of the roughness of 6.

Figure 3:
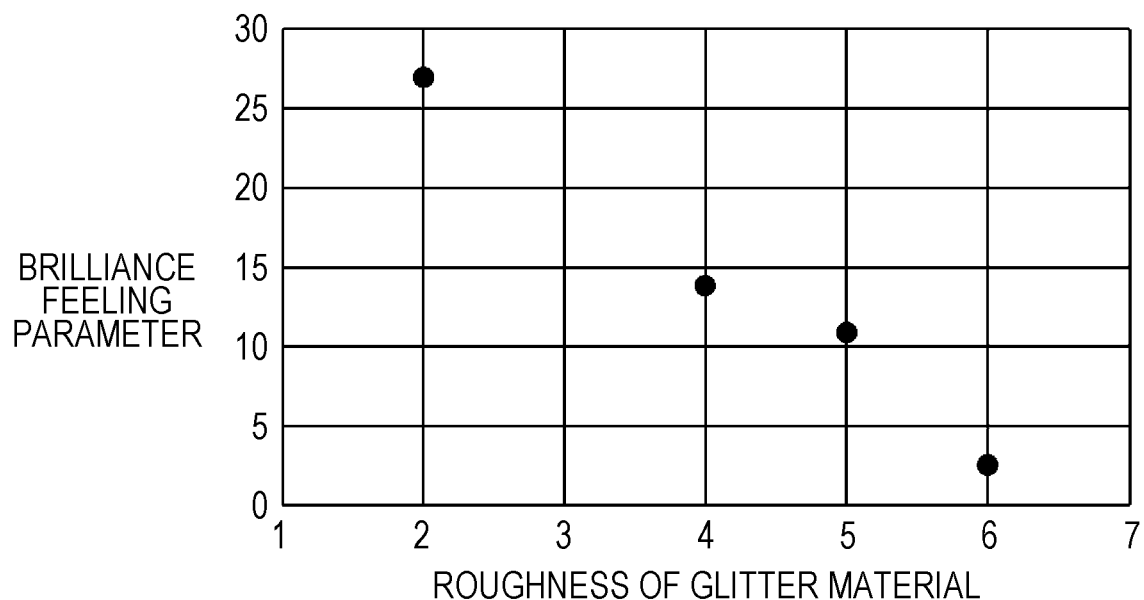
FIG. 3 is a graph illustrating a relationship between roughness of a glitter material and a brilliance feeling parameter.

Prior to the description of the first example, a relationship between the brilliance feeling parameter and the roughness of the glitter material and a relationship between L* (a value indicating brightness) and the roughness of the glitter material will be described as a comparison. FIG. 3 is a graph illustrating a relationship between the roughness of the glitter material and the brilliance feeling parameter. The horizontal axis of the graph indicates the roughness of the glitter material. The vertical axis indicates the brilliance feeling parameter. The brilliance feeling parameter can be measured by using a camera.

The brilliance feeling parameter in the case of the roughness of 2 is the brilliance feeling parameter of the sample of the roughness of 2. Similarly, the brilliance feeling parameters in the case of the roughness of 4, the roughness of 5, and the roughness of 6 are respectively the brilliance feeling parameters of the sample of the roughness of 4, the sample of the roughness of 5, and the sample of the roughness of 6.

As the roughness of the glitter material (the index value) increased, the brilliance feeling parameter decreased. Thus, it was found that the brilliance feeling parameter was correlated with the roughness of the glitter material. However, since the brilliance feeling parameter cannot be measured by a colorimeter, a camera is necessary.

Figure 4:
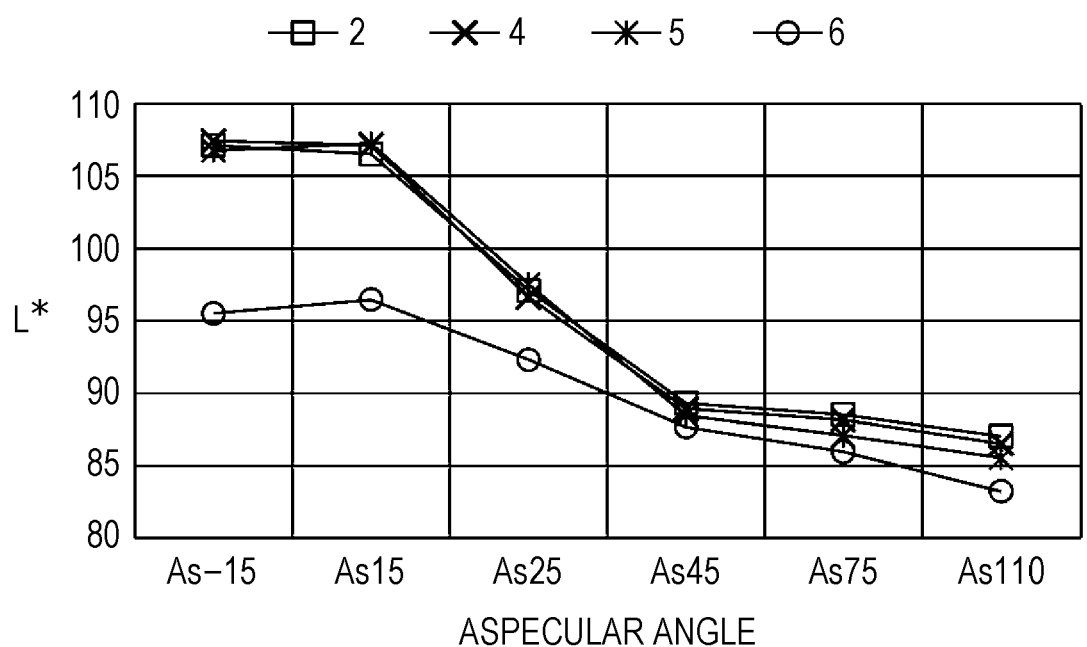
FIG. 4 is a graph illustrating a relationship among roughness of a glitter material, an aspecular angle, and L*.

FIG. 4 is a graph illustrating a relationship among the roughness of the glitter material, the aspecular angle, and L*. The horizontal axis of the graph indicates the aspecular angle. The vertical axis indicates L*. The L* is measured by a colorimeter.

"2" of the graph indicates the data in the case of the sample of the roughness of 2. Similarly, "4", "5", and "6" respectively indicate the data in the case of the samples of the roughness of 4, the roughness of 5, and the roughness of 6. In the case of the sample of the roughness of 2, the sample of the roughness of 4, and the sample of the roughness of 5, it was found that a relationship between the aspecular angle and L* was almost the same. Thus, it was proved that L* was not correlated with the roughness of the glitter material.

Figure 5:
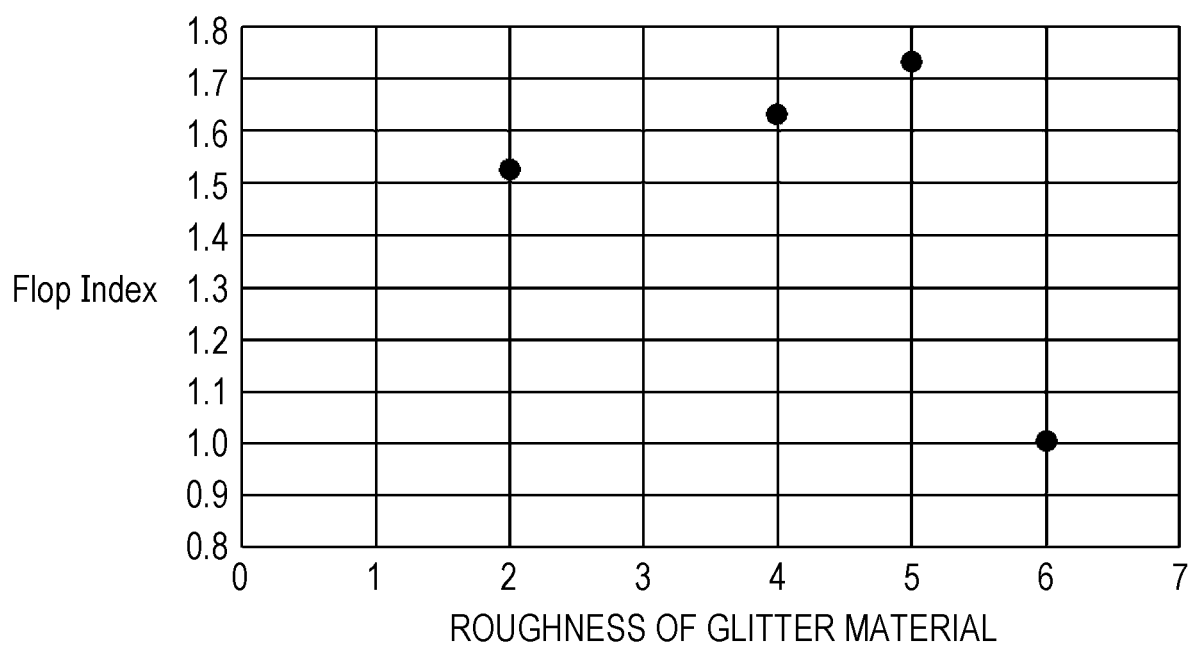
FIG. 5 is a graph illustrating a relationship between roughness of a glitter material and a flop index.

FIG. 5 is a graph illustrating a relationship between the roughness of the glitter material and the flop index. The horizontal axis of the graph indicates the roughness of the glitter material. The vertical axis indicates the flop index. The flop index is a value determined by the aspecular angle and L* and is defined by the following equation.

$$\text{Flop Index} = \frac{2.69(L^*_{15°} - L^*_{110°})^{1.11}}{(L^*_{45°})^{0.86}}$$ [Math. 2]

As illustrated in FIG. 5, it was proved that the flop index was not correlated with the roughness of the glitter material.

Figure 6:
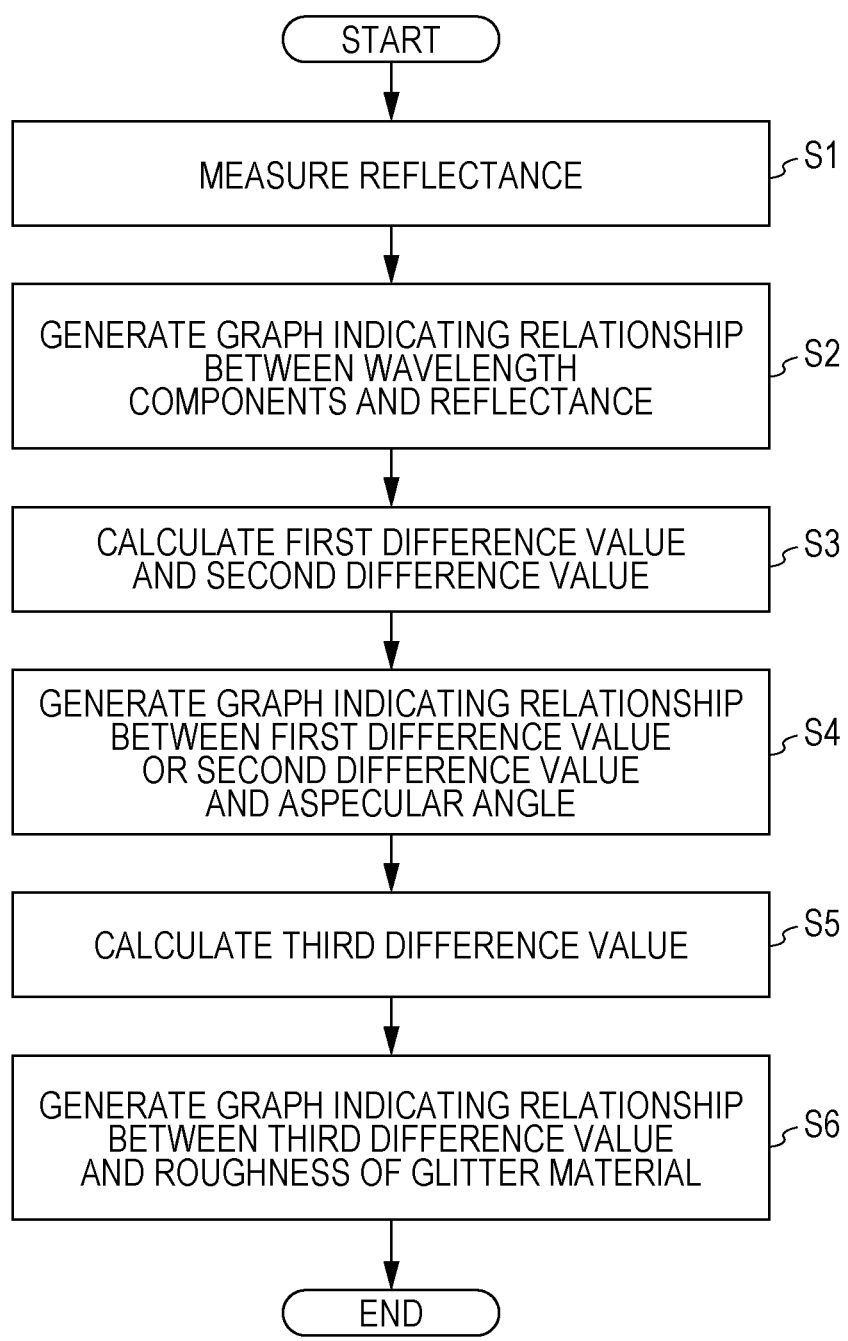
FIG. 6 is a flowchart describing a first example.

In the first example, data correlated with the roughness of the glitter material is obtained by using the step illustrated in FIG. 6. Referring to FIGS. 1 and 6, the measurement part 10 measures the reflectance for each of the plurality of wavelength components constituting the reflected light reflected from the glitter material-containing coating film (step S1). The plurality of wavelength components are included in the wavelength band of 400 nm to 700 nm. The measurement part 10 performs step S1 on each of the sample of the roughness of 2, the sample of the roughness of 4, the sample of the roughness of 5, and the sample of the roughness of 6.

The generation unit 55 generates a graph indicating a relationship between the plurality of wavelength components and the reflectance by using the result of step S1 (step S2). The generation unit 55 performs step S2 on each of the sample of the roughness of 2, the sample of the roughness of 4, the sample of the roughness of 5, and the sample of the roughness of 6. The control calculation unit 5 displays a graph generated by step S2 (a graph illustrated in FIGS. 7 to 10) on a display unit (not illustrated) included in the output unit 9.

Figure 7:
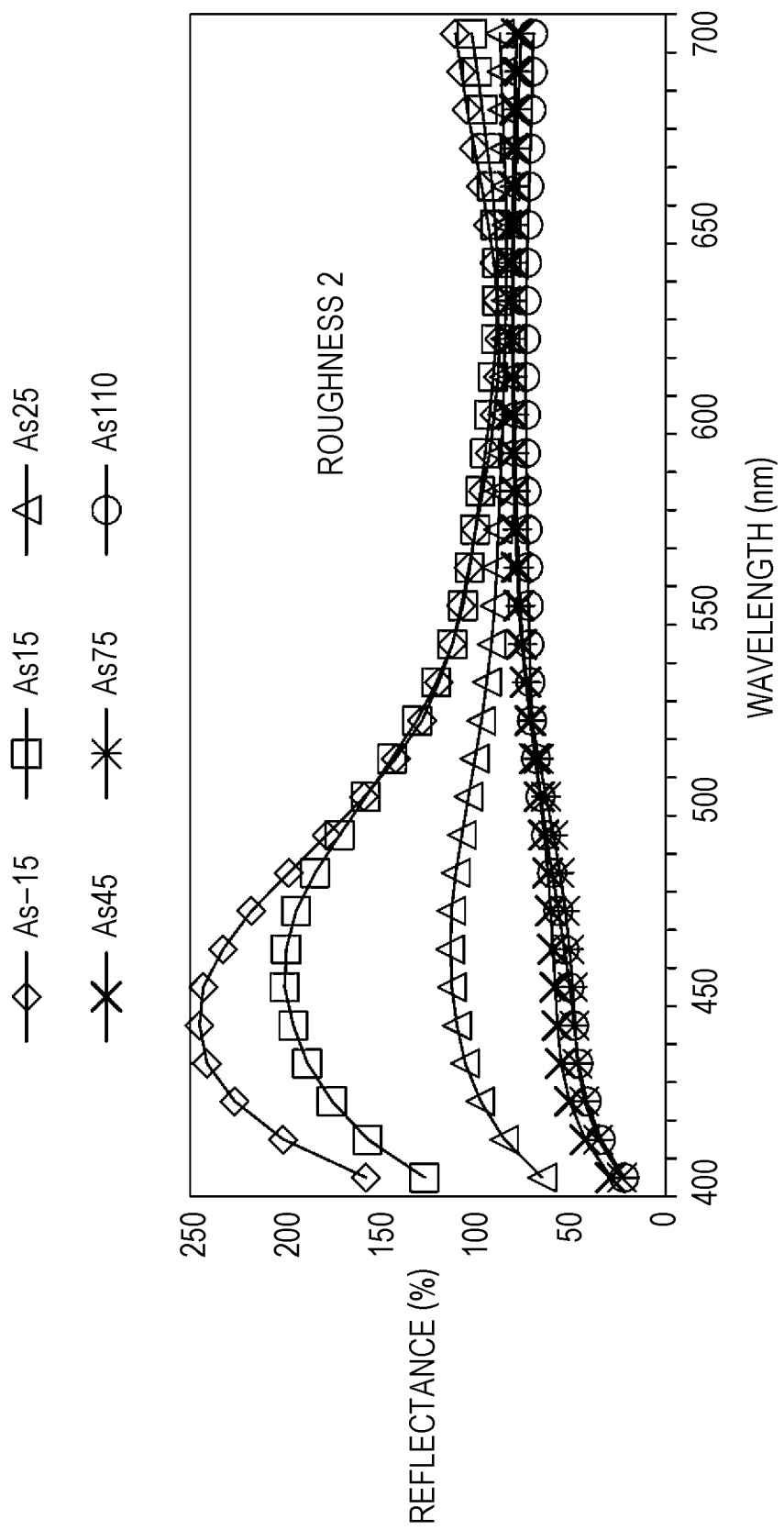
FIG. 7 is a graph illustrating a relationship between a wavelength component and a reflectance for a sample having roughness of 2.
Figure 8:
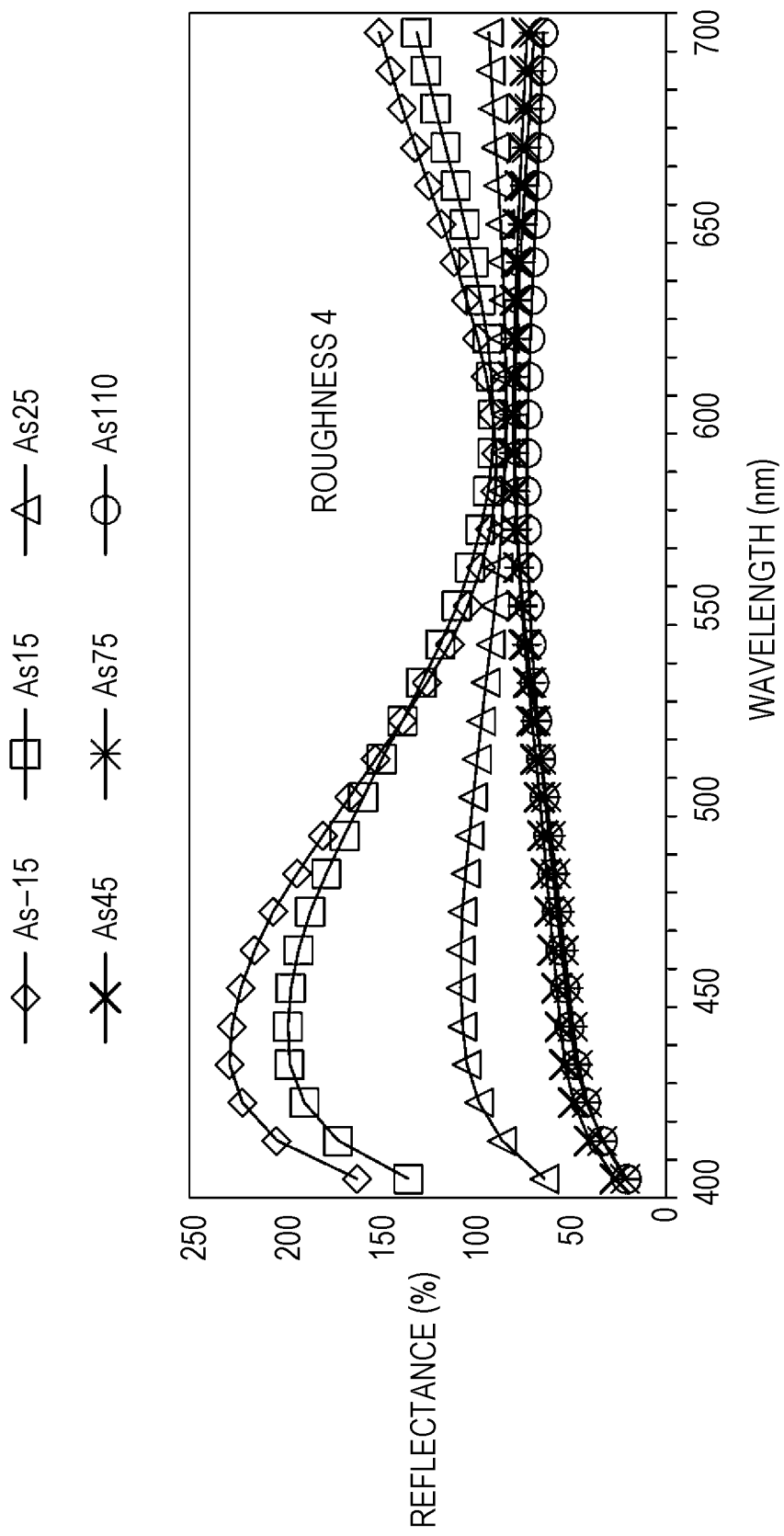
FIG. 8 is a graph illustrating a relationship between a wavelength component and a reflectance for a sample having roughness of 4.

FIG. 7 is a graph illustrating a relationship between the wavelength component and the reflectance for the sample of the roughness of 2. FIG. 8 is a graph illustrating a relationship between the wavelength component and the reflectance for the sample of the roughness of 4.

Figure 9:
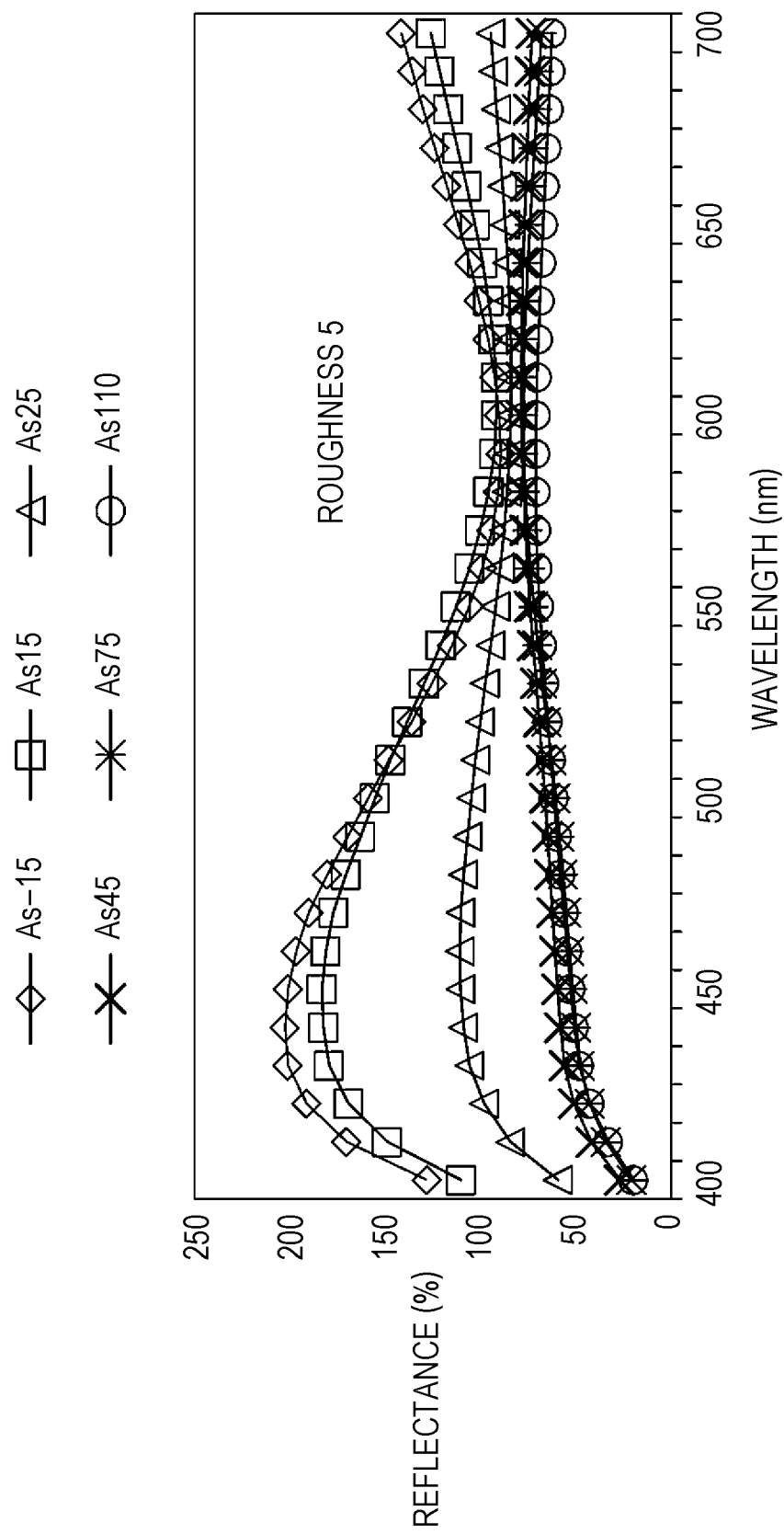
FIG. 9 is a graph illustrating a relationship between a wavelength component and a reflectance for a sample having roughness of 5.
Figure 10:
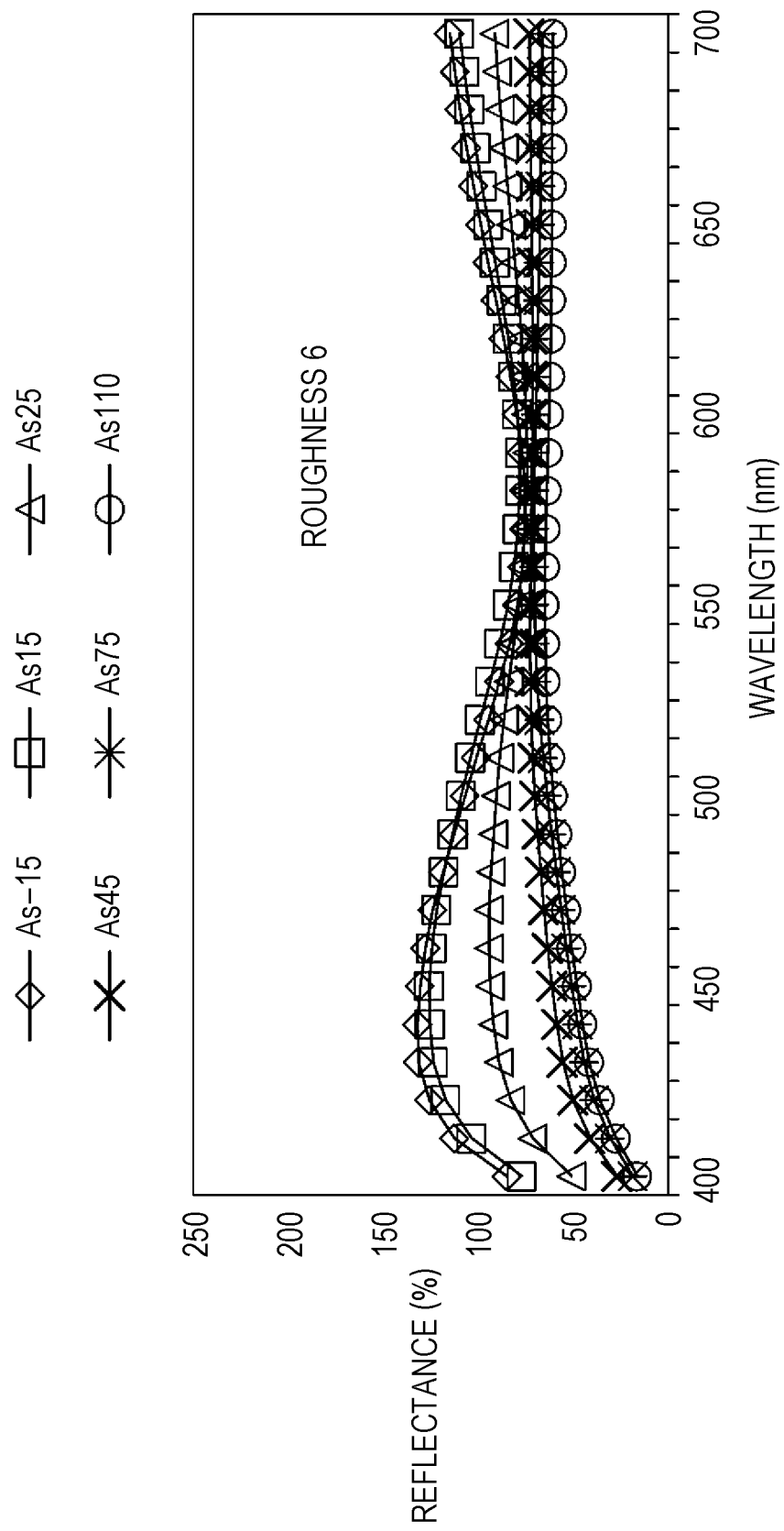
FIG. 10 is a graph illustrating a relationship between a wavelength component and a reflectance for a sample having roughness of 6.

FIG. 9 is a graph illustrating a relationship between the wavelength component and the reflectance for the sample of the roughness of 5. FIG. 10 is a graph illustrating a relationship between the wavelength component and the reflectance for the sample of the roughness of 6.

In FIGS. 7 to 10, the horizontal axis indicates the wavelength component and the vertical axis indicates the reflectance. "As −15" indicates the case of the reflected light RLa at the aspecular angle of −15°, "As 15" indicates the case of the reflected light RLb at the aspecular angle of 15°, "As 25" indicates the case of the reflected light RLc at the aspecular angle of 25°, "As 45" indicates the case of the reflected light RLd at the aspecular angle of 45°, "As 75" indicates the case of the reflected light RLe at the aspecular angle of 75°, and "As 110" indicates the case of the reflected light RLf at the aspecular angle of 110°.

FIGS. 7 to 10 include the first graph and the second graph. In the case of "As −15", "As 15", and "As 25", the first graph is formed. In the case of "As 75" and "As 110", the second graph is formed.

Figure 11:
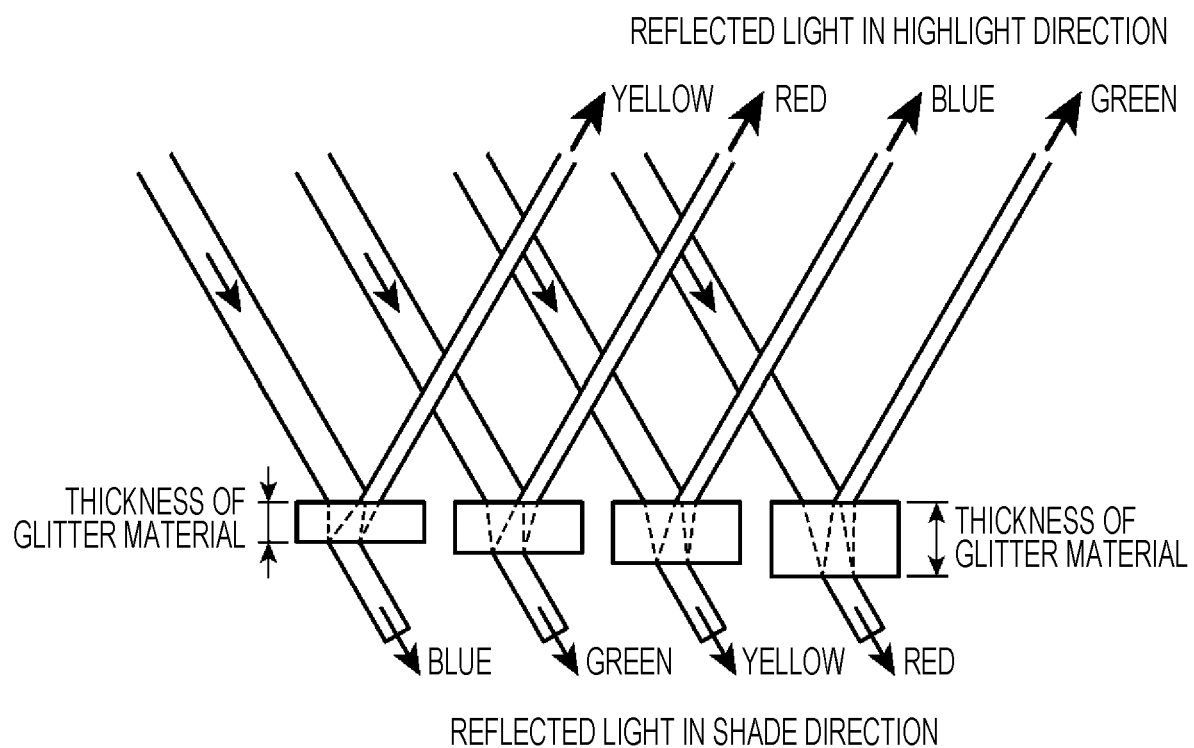
FIG. 11 is an explanatory diagram describing a relationship between reflected light in a highlight direction and reflected light in a shade direction.

A relationship between the reflected light in the highlight direction and the reflected light in the shade direction will be described. FIG. 11 is an explanatory diagram describing this relationship. The reflected light in the highlight direction is light reflected by the glitter material due to the interference effect of the glitter material. When the thickness of the glitter material is different, the wavelength generating the interference effect is different. In contrast, the reflected light in the shade direction is light which is not reflected by the glitter material, is transmitted through the glitter material-containing coating film, and is reflected by a base material (not illustrated) (for example, base paint). Thus, the reflected light in the highlight direction and the reflected light in the shade direction have a complementary color relationship. For example, when the reflected light in the highlight direction is viewed as blue, the reflected light in the shade direction is viewed as yellow.

A description is made by returning to FIGS. 7 to 10. Referring to these drawings, it was found that the reflectance of the reflected light in the highlight direction (the reflected light RLa at the aspecular angle of −15°, the reflected light RLb at the aspecular angle of 15°, and the reflected light RLc at the aspecular angle of 25°) largely changed in the vicinity of 450 nm and became a peak value in the vicinity of 450 nm. For this reason, in the first example, the reflected light in the highlight direction was viewed as blue. For the reflected light in the shade direction (the reflected light RLe at the aspecular angle of 75° and the reflected light RLf at the aspecular angle of 110°), the reflectance (corresponding to a blue element) in the vicinity of 450 nm is relatively lower than the reflectance (corresponding to green and red elements) at 550 nm to 700 nm in the wavelength band of 400 nm to 700 nm. For this reason, the reflected light in the shade direction was viewed as a complementary color of blue (yellowish color).

It was found that the reflectance of the reflected light in the highlight direction, the reflectance of the reflected light in the shade direction, and the reflectance of the reflected light in the face direction (the reflected light RLd at the aspecular angle of 45°) were almost the same in the vicinity of 600 nm.

The wavelength component of which the reflectance has a peak value in 400 nm to 700 nm is set as a first wavelength component and the wavelength component of which the wavelength is different from that of the first wavelength component is set as a second wavelength component. The second wavelength component is the wavelength component included in the wavelength band in which the reflectance is stable and/or has a low value in 400 nm to 700 nm. In the first example, the wavelength component of 450 nm becomes the first wavelength component and the wavelength component of 600 nm becomes the second wavelength component.

The first calculator 56 calculates a difference value which is a difference between the reflectance of the first wavelength component and the reflectance of the second wavelength component by using the graphs illustrated in FIGS. 7 to 10 (step S3). The first calculator 56 performs step S3 on each of the sample of the roughness of 2, the sample of the roughness of 4, the sample of the roughness of 5, and the sample of the roughness of 6. A difference value of the reflected light in the highlight direction (the reflected light RLa at the aspecular angle of −15°, the reflected light RLb at the aspecular angle of 15°, and the reflected light RLc at the aspecular angle of 25°) is a first difference value. A difference value of the reflected light in the shade direction (the reflected light RLe at the aspecular angle of 75° and the reflected light RLf at the aspecular angle of 110°) is a second difference value.

Figure 12:
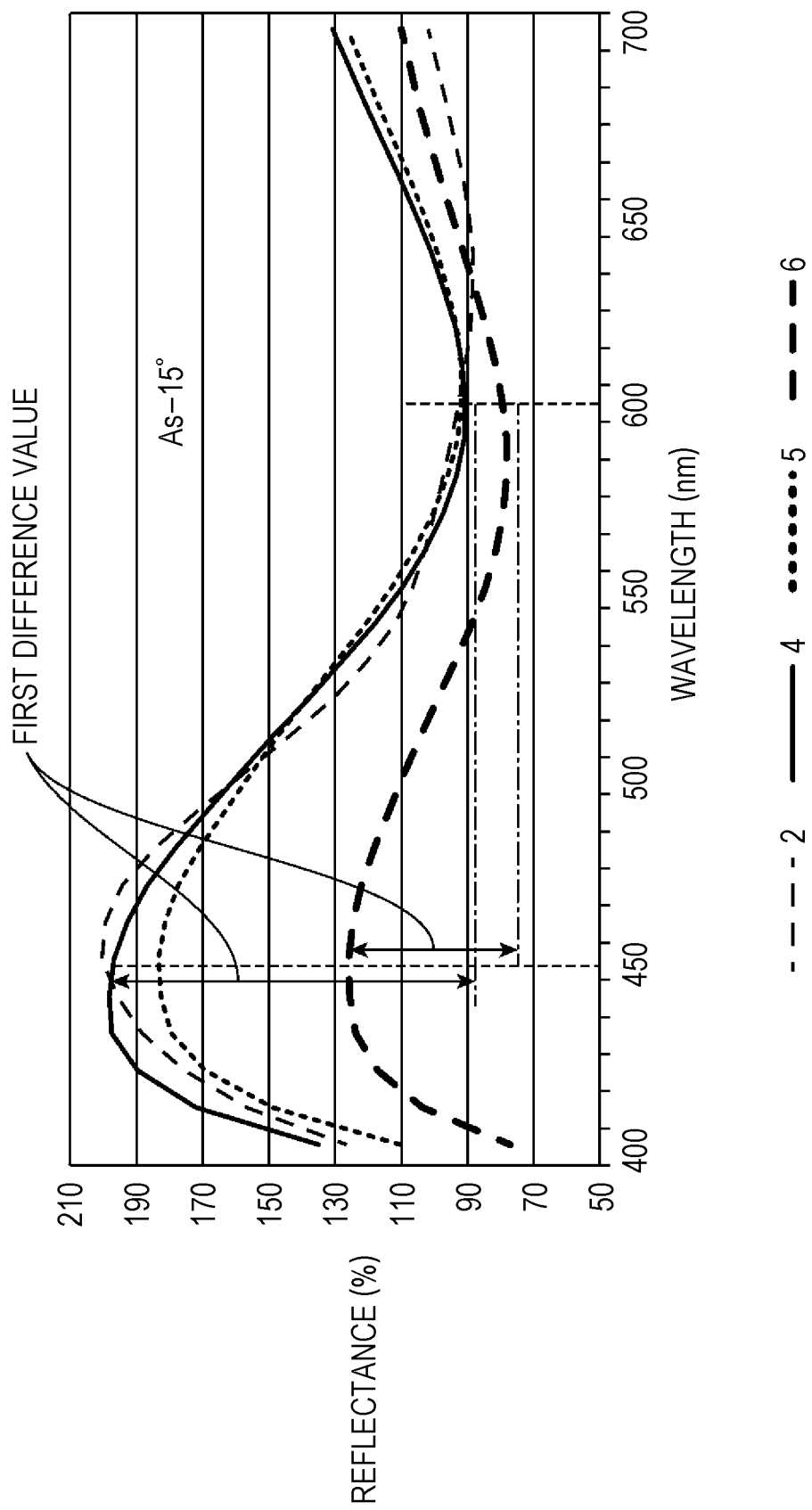
FIG. 12 is a graph collecting data in the case of an aspecular angle of −15° included in each of FIGS. 7 to 10.

Step S3 will be described in detail. FIG. 12 is a graph collecting data in the case of the aspecular angle of −15° included in each of FIGS. 7 to 10. In FIG. 12, the horizontal axis indicates the wavelength component, the vertical axis indicates the reflectance, and "2" indicates the case of the sample of the roughness of 2. Similarly, "4", "5", and "6" respectively indicate the cases of the samples of the roughness of 4, 5, and 6.

The first difference value (the difference between the reflectance at 450 nm and the reflectance at 600 nm) for each of the sample of the roughness of 2, the sample of the roughness of 4, the sample of the roughness of 5, and the sample of the roughness of 6 is calculated.

Figure 13:
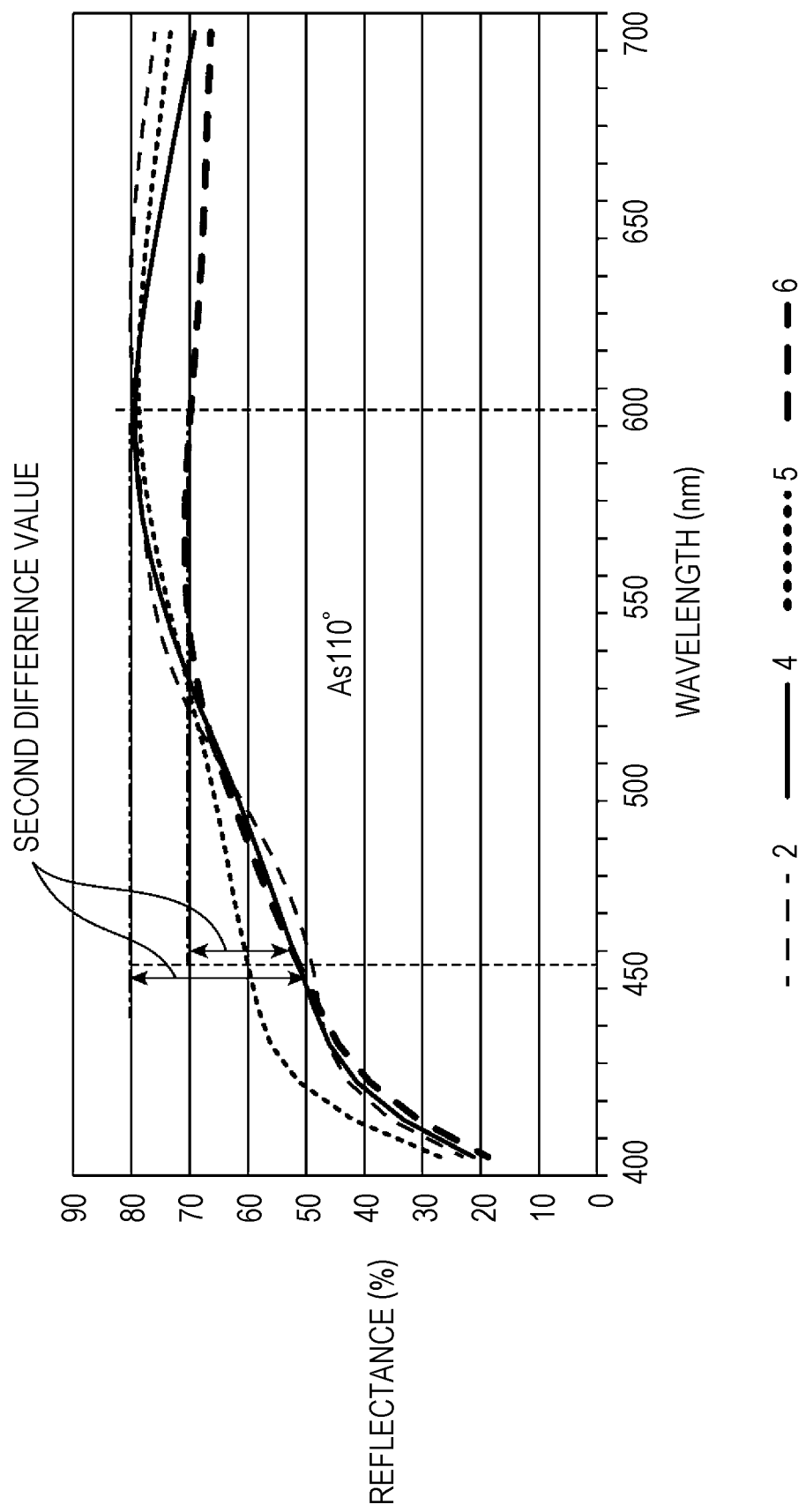
FIG. 13 is a graph collecting data in the case of an aspecular angle of 110° included in each of FIGS. 7 to 10.

The first calculator 56 also performs the same process as that of the data at the aspecular angle of −15° on the data of the remaining aspecular angles. This will be described by exemplifying the data at the aspecular angle of 110°. FIG. 13 is a graph collecting the data at the aspecular angle of 110° included in each of FIGS. 7 to 10. The horizontal axis of the graph indicates the wavelength component and the vertical axis indicates the reflectance. "2", "4", "5", and "6" have the same meaning as that of FIG. 12.

Figure 14:
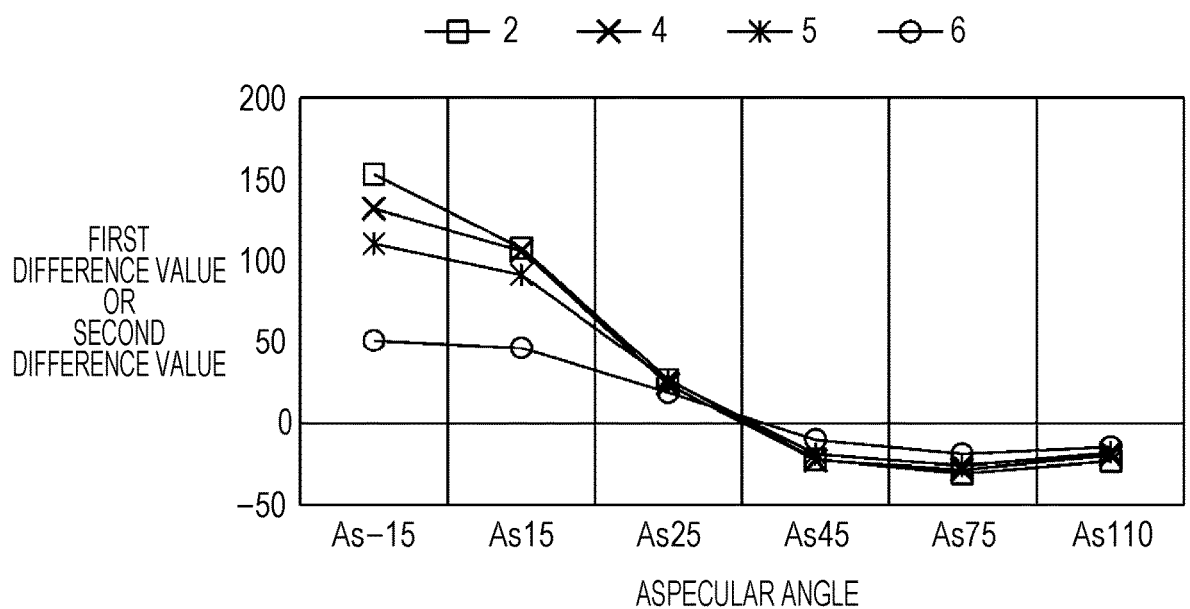
FIG. 14 is a graph illustrating a relationship between a first difference value or a second difference value and an aspecular angle.

The generation unit 55 generates a graph illustrated in FIG. 14 by using the result of step S3 (step S4). The control calculation unit 5 displays the graph illustrated in FIG. 14 on a display unit (not illustrated) included in the output unit 9. FIG. 14 is a graph illustrating a relationship between the first difference value or the second difference value and the aspecular angle. The horizontal axis of the graph indicates the aspecular angle and the vertical axis indicates the first difference value in the highlight direction and the second difference value in the shade direction. "2" indicates the data in the case of the sample of the roughness of 2. Similarly, "4", "5", and "6" respectively indicate the data in the case of the samples of the roughness of 4, the roughness of 5, and the roughness of 6. It was found that the first difference value decreased as the index value (here, the roughness) increased at the aspecular angle of −15°. Thus, it was found that the first difference value was correlated with the index value and these four first difference values were data correlated with the index value.

The second calculator 57 calculates a third difference value by using the equation expressed by Math. 1 (step S5). The second calculator 57 performs step S5 on each of the sample of the roughness of 2, the sample of the roughness of 4, the sample of the roughness of 5, and the sample of the roughness of 6. The generation unit 55 generates the graph illustrated in FIG. 15 (step S6). The control calculation unit 5 displays the graph illustrated in FIG. 15 on a display unit (not illustrated) included in the output unit 9.

Figure 15:
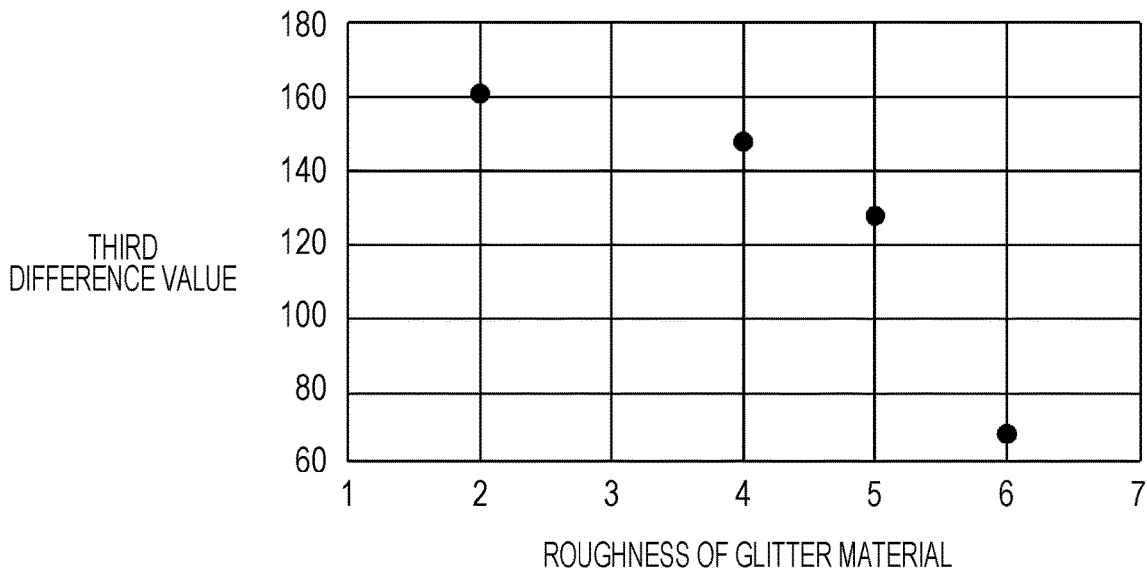
FIG. 15 is a graph illustrating a relationship between a third difference value and roughness of a glitter material.

FIG. 15 is a graph illustrating a relationship between the third difference value and the roughness of the glitter material. The horizontal axis of the graph indicates the roughness of the glitter material and the vertical axis indicates the third difference value. The third difference value in the case of the roughness of 2 indicates the third difference value calculated by using the data indicated by "2" of FIG. 14 (the data in the case of the sample of the roughness of 2). Similarly, the third difference values in the case of the roughness of 4, the roughness of 5, and the roughness of 6 respectively indicate the third difference values calculated by using the data indicated by "4" of FIG. 14 (the data in the case of the sample of the roughness of 4), the data indicated by "5" (the data in the case of the sample of the roughness of 5), and the data indicated by "6" (the data in the case of the sample of the roughness of 6).

It was understood that the third difference value decreased as the index value (here, the roughness) increased. Thus, it was understood that the third difference value was correlated with the index value and these four third difference values were data correlated with the index value.

The above-described configuration is the first example. Next, the second example will be described, but the calculation of the correlation equation and the calculation of the index value described after the second example can be understood without reading the second example.

The second example is for the glitter material-containing coating film formed by using white paint. As the glitter material, white pearl is used. The roughness of the particle of the glitter material is indicated by ten levels of the roughness of 1 to the roughness of 10. As the numerical value increases, the glitter material becomes finer. Thus, the glitter material is finest in the case of the roughness of 10.

As the sample of the glitter material-containing coating film, the sample of the roughness of 1, the sample of the roughness of 2, the sample of the roughness of 4, the sample of the roughness of 5, the sample of the roughness of 6, the sample of the roughness of 8, and the sample of the roughness of 9 were used. The meaning of these samples is the same as that of the first example. For example, the sample of the roughness of 1 is the glitter material-containing coating film formed by white paint containing the glitter material of the roughness of 1.

Figure 16:
FIG. 16 is a graph illustrating a relationship between roughness of a glitter material and a brilliance feeling parameter.

Prior to the description of the second example, a relationship between the brilliance feeling parameter and the roughness of the glitter material and a relationship between L* (a value indicating brightness) and the roughness of the glitter material will be described as a comparison. FIG. 16 is a graph illustrating a relationship between the roughness of the glitter material and the brilliance feeling parameter and corresponds to FIG. 3.

The brilliance feeling parameter decreased as the roughness of the glitter material (the index value) increased. Thus, it was found that the brilliance feeling parameter was correlated with the roughness of the glitter material. However, since the brilliance feeling parameter cannot be measured by a colorimeter, a camera is necessary.

Figure 17:
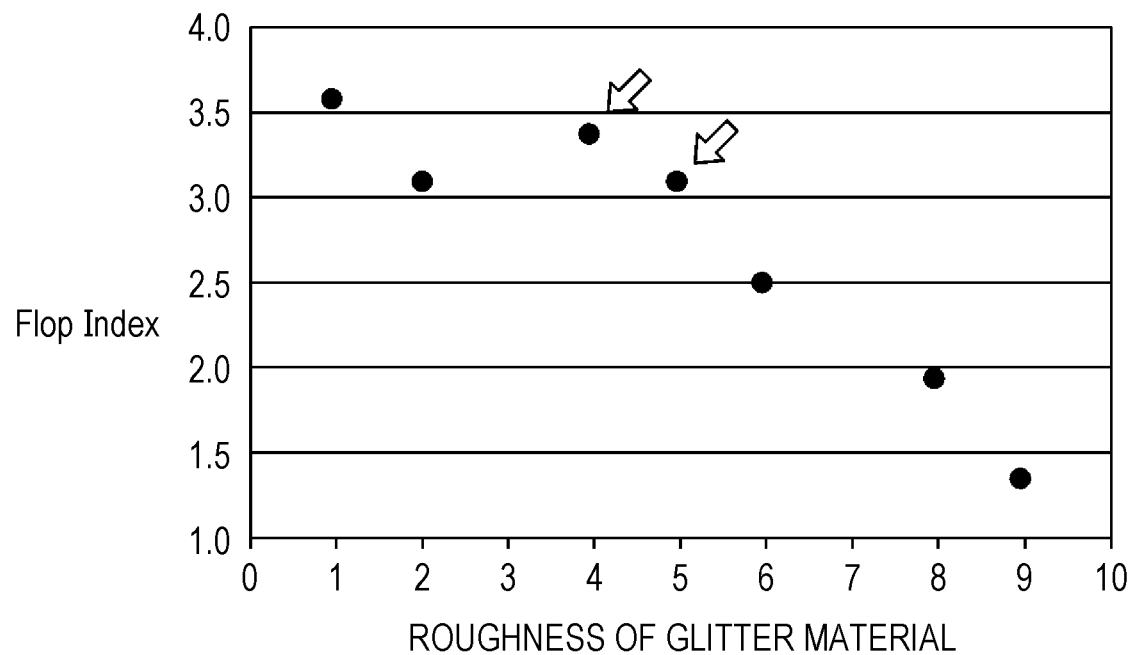
FIG. 17 is a graph illustrating a relationship between roughness of a glitter material and a flop index.

FIG. 17 is a graph illustrating a relationship between the roughness of the glitter material and the flop index and corresponds to FIG. 5. It was proved that the flop index is not correlated with the roughness of the glitter material.

Similarly to the first example, the second example obtains data correlated with the roughness of the glitter material by using the step illustrated in FIG. 6. Referring to FIGS. 1 and 6, the measurement part 10 measures the reflectance for each of the plurality of wavelength components constituting the reflected light reflected from the glitter material-containing coating film similarly to the first example (step S1). The plurality of wavelength components are included in the wavelength band of 400 nm to 700 nm. The measurement part 10 performs step S1 on each of the sample of the roughness of 1, the sample of the roughness of 2, the sample of the roughness of 4, the sample of the roughness of 5, the sample of the roughness of 6, the sample of the roughness of 8, and the sample of the roughness of 9.

Similarly to the first example, the generation unit 55 generates a graph illustrating a relationship between the plurality of wavelength components and the reflectance by using the result of step S1 (step S2). The generation unit 55 performs step S2 on each of the sample of the roughness of 1, the sample of the roughness of 2, the sample of the roughness of 4, the sample of the roughness of 5, the sample of the roughness of 6, the sample of the roughness of 8, and the sample of the roughness of 9. Similarly to the first example, the control calculation unit 5 displays the graph generated by step S2 on a display unit (not illustrated) included in the output unit 9. As the graph illustrating the result of step S2, the sample of the roughness of 1, the sample of the roughness of 5, and the sample of the roughness of 9 will be described as an example.

Figure 18:
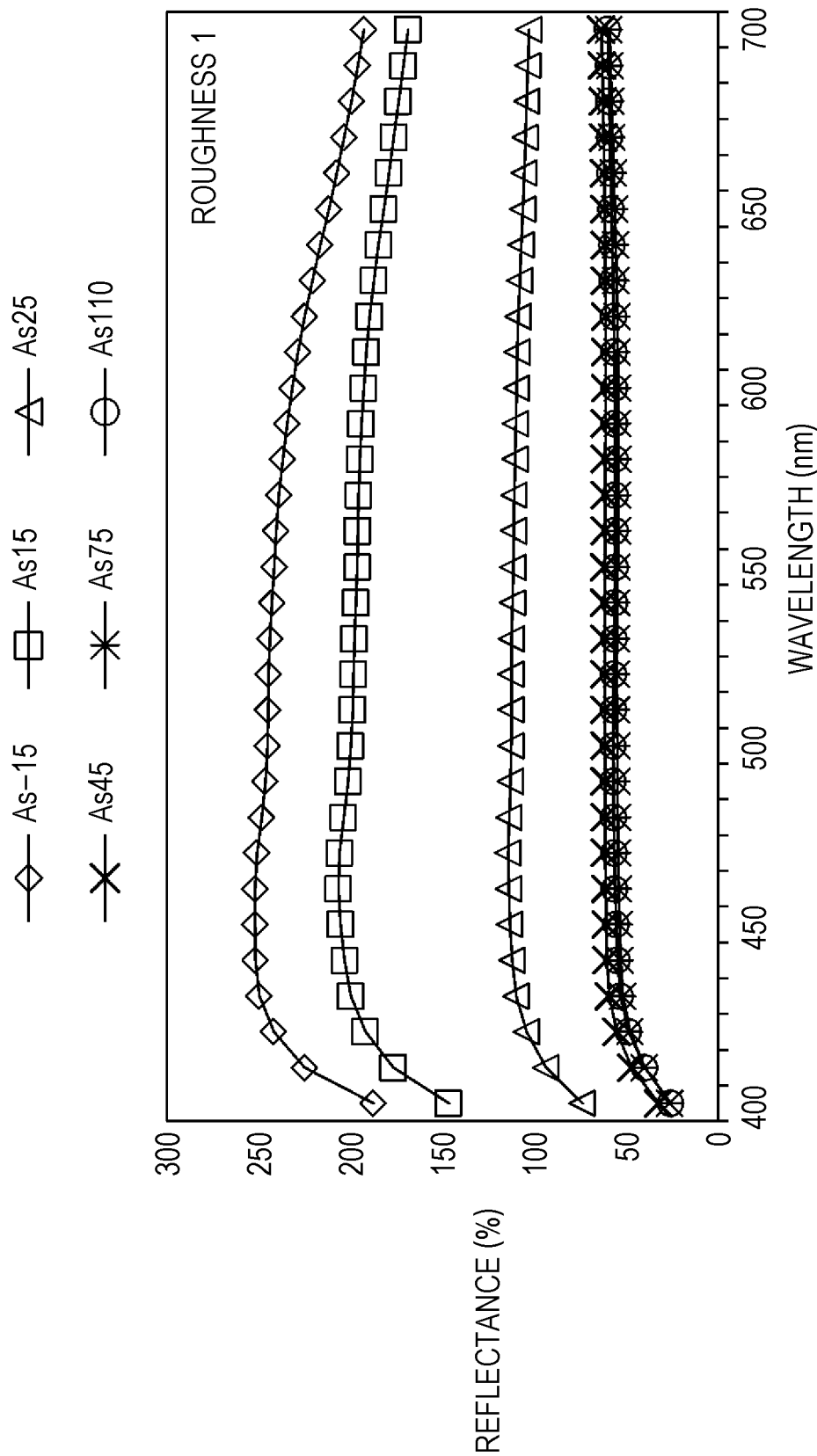
FIG. 18 is a graph illustrating a relationship between a wavelength component and a reflectance for a sample having roughness of 1.
Figure 19:
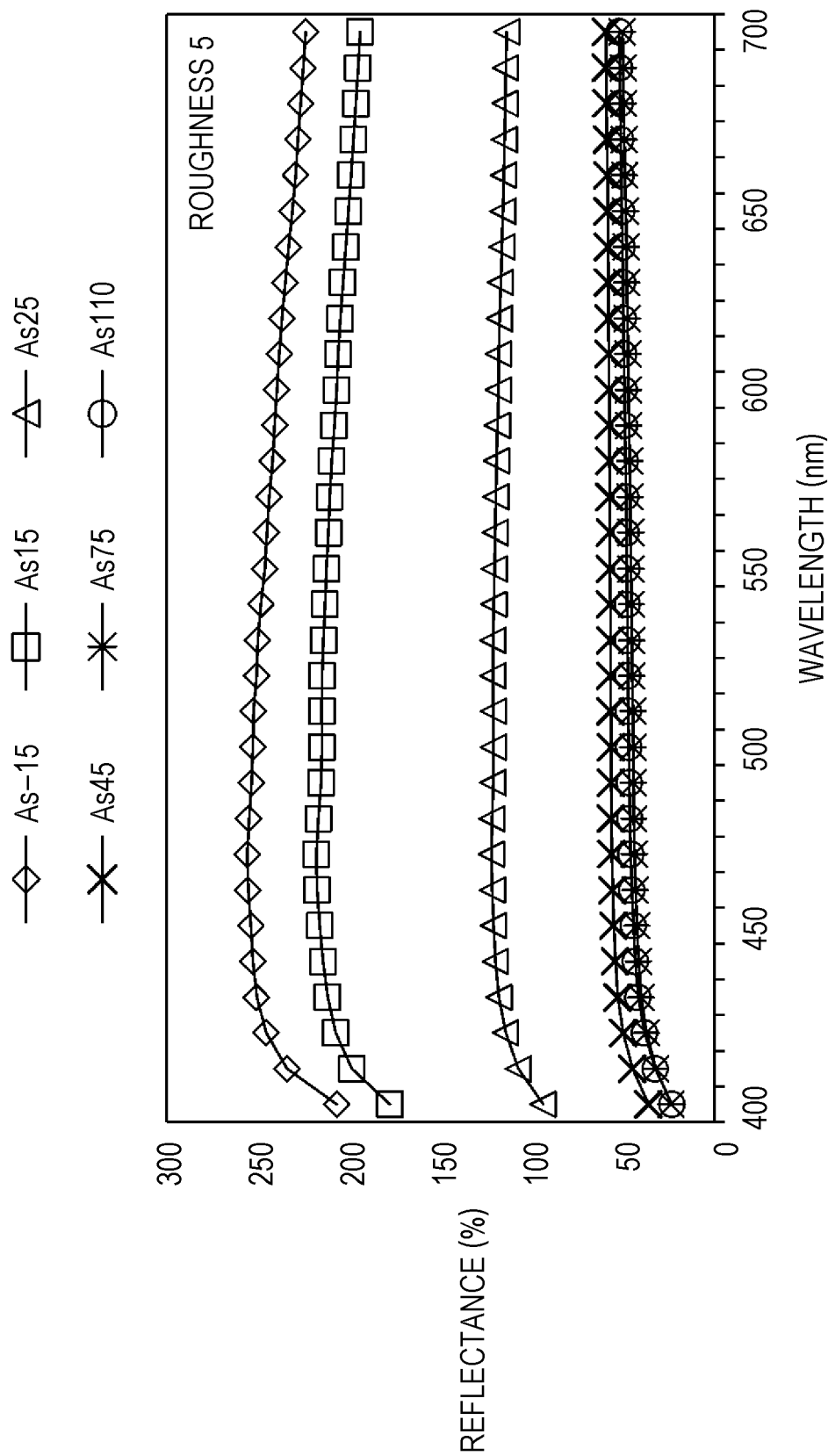
FIG. 19 is a graph illustrating a relationship between a wavelength component and a reflectance for a sample having roughness of 5.
Figure 20:
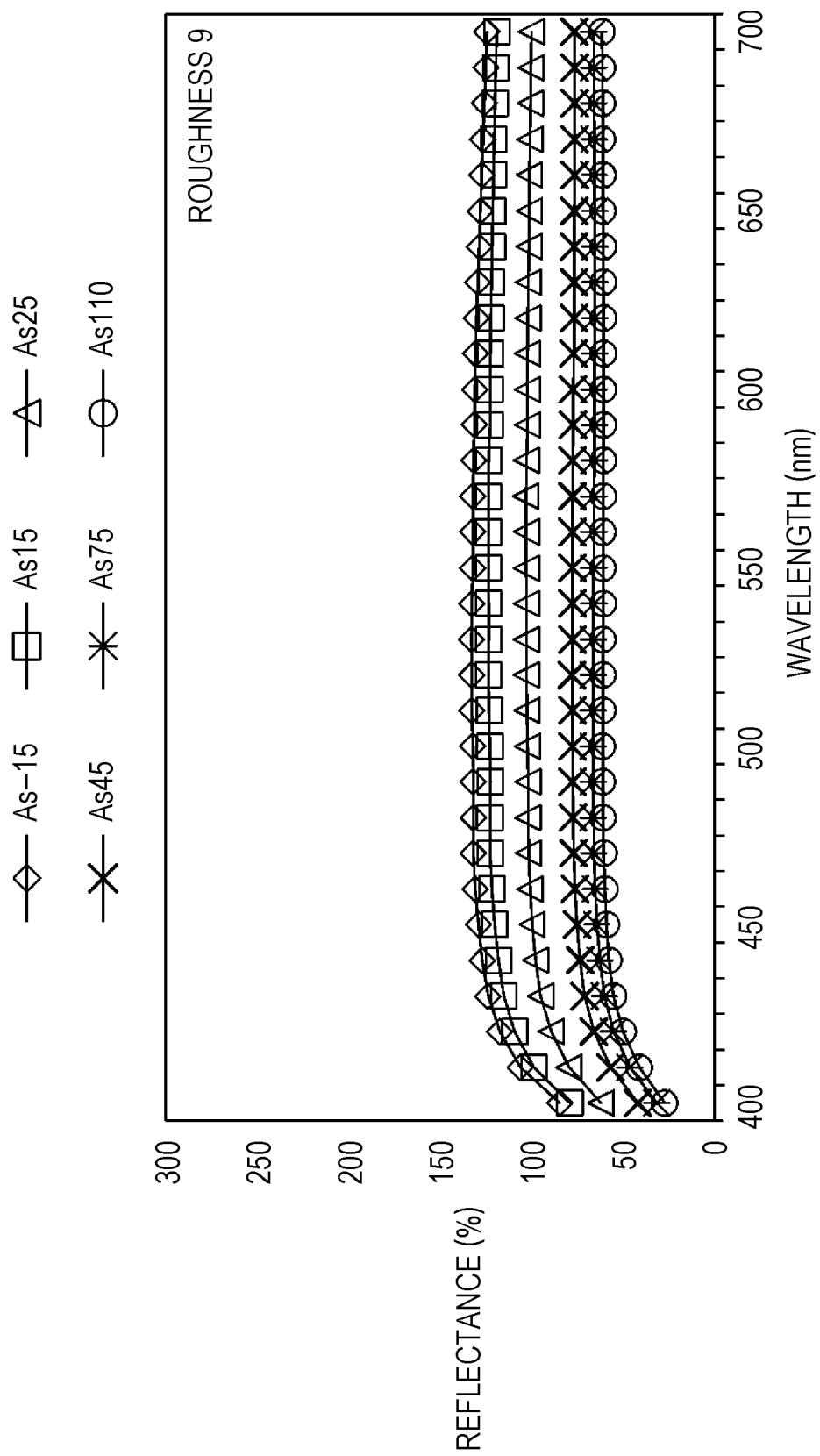
FIG. 20 is a graph illustrating a relationship between a wavelength component and a reflectance for a sample having roughness of 9.

FIG. 18 is a graph illustrating a relationship between the wavelength component and the reflectance for the sample of the roughness of 1. FIG. 19 is a graph illustrating a relationship between the wavelength component and the reflectance for the sample of the roughness of 5. FIG. 20 is a graph illustrating a relationship between the wavelength component and the reflectance for the sample of the roughness of 9. These graphs correspond to FIGS. 7 to 10.

FIGS. 18 to 20 include the first graph and the second graph. In the case of "As −15", "As 15", and "As 25", the first graph is formed. In the case of "As 75" and "As 110", the second graph is formed.

In the case of the aspecular angles of −15° and 15°, the peak value of the reflectance slightly existed in the vicinity of 450 nm, but it was proved that a change in reflectance according to the wavelength component was small. This was because of the white sample (the sample viewed as white).

Figure 21:
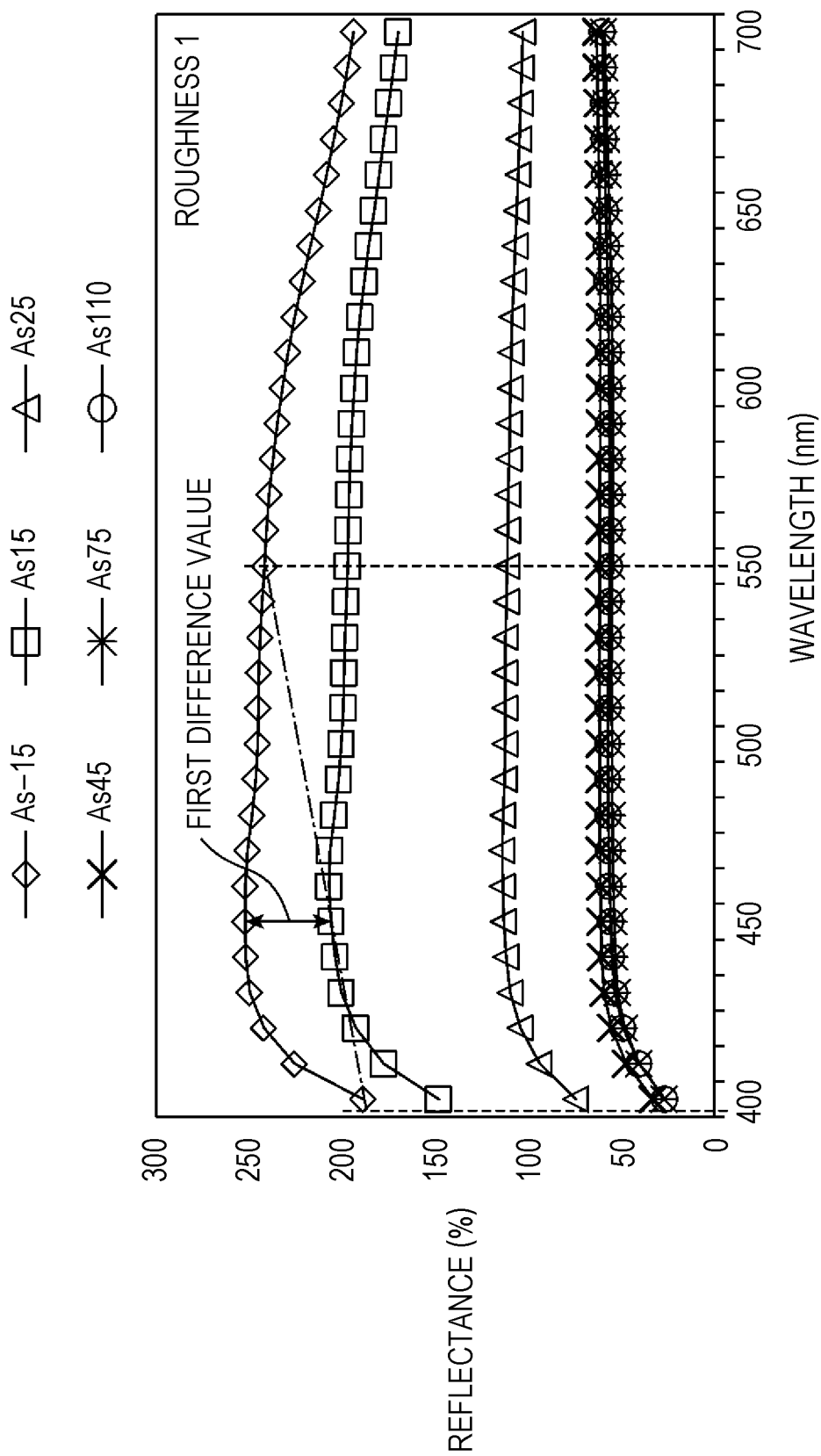
FIG. 21 is an explanatory diagram describing a method of determining a reflectance of a second wavelength component based on the graph illustrated in FIG. 18.

In the second example, the wavelength component of 450 nm becomes the first wavelength component. The wavelength component included in the wavelength band in which the reflectance is stable is, for example, the wavelength component at 550 nm. However, a difference between the reflectance of the wavelength component at 550 nm and the reflectance of the wavelength component at 450 nm is small. Here, in the second example, the reflectance of the second wavelength component is determined by using the following method. FIG. 21 is an explanatory diagram describing a method of determining the reflectance of the second wavelength component based on the graph illustrated in FIG. 18. In the second example, the first calculator 56 calculates a functional equation indicating a line connecting the reflectance of the wavelength component at 400 nm and the reflectance of the wavelength component at 550 nm, obtains the reflectance by applying 450 nm to this functional equation, and determines the reflectance as the reflectance of the second wavelength component.

The first calculator 56 calculates a difference value which is a difference between the reflectance of the first wavelength component and the reflectance of the second wavelength component (step S3). The first calculator 56 performs step S3 on each of the sample of the roughness of 1, the sample of the roughness of 2, the sample of the roughness of 4, the sample of the roughness of 5, the sample of the roughness of 6, the sample of the roughness of 8, and the sample of the roughness of 9. The difference value of the reflected light in the highlight direction (the reflected light RLa at the aspecular angle of −15°, the reflected light RLb at the aspecular angle of 15°, and the reflected light RLc at the aspecular angle of 25°) is the first difference value. The difference value in the reflected light in the shade direction (the reflected light RLe at the aspecular angle of 75° and the reflected light RLf at the aspecular angle of 110°) is the second difference value.

Figure 22:
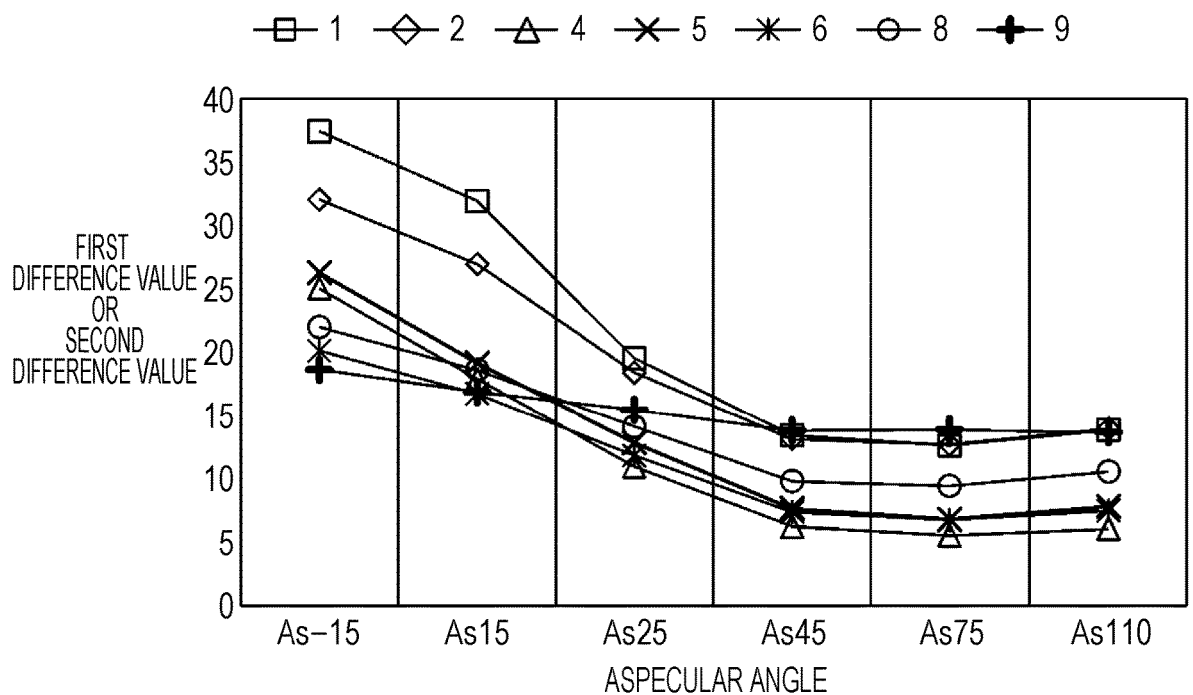
FIG. 22 is a graph illustrating a relationship between a first difference value or a second difference value and an aspecular angle.

Similarly to the first example, the generation unit 55 generates a graph illustrated in FIG. 22 by using the result of step S3 (step S4). The control calculation unit 5 displays the graph illustrated in FIG. 22 on a display unit (not illustrated) included in the output unit 9. FIG. 22 is a graph illustrating a relationship between the first difference value or the second difference value and the aspecular angle and corresponds to FIG. 14. "1" indicates the data in the case of the sample of the roughness of 1. Similarly, "2", "4", "5", "6", "8", and "9" respectively indicate the data in the case of the samples of the roughness of 2, the roughness of 4, the roughness of 5, the roughness of 6, the roughness of 8, and the roughness of 9. In the first example, a relationship (that is, a correlation) in which the first difference value decreased in accordance with an increase in the index value (here, the roughness) at the aspecular angle of −15° was established. However, in the second example, the correlation was not established.

Similarly to the first example, the second calculator 57 calculates the third difference value by using the equation expressed by Math. 1 (step S5). The second calculator 57 performs step S5 on each of the sample of the roughness of 1, the sample of the roughness of 2, the sample of the roughness of 4, the sample of the roughness of 5, the sample of the roughness of 6, the sample of the roughness of 8, and the sample of the roughness of 9. The generation unit 55 generates a graph illustrated in FIG. 23 (step S6). The control calculation unit 5 displays the graph illustrated in FIG. 23 on a display unit (not illustrated) included in the output unit 9.

Figure 23:
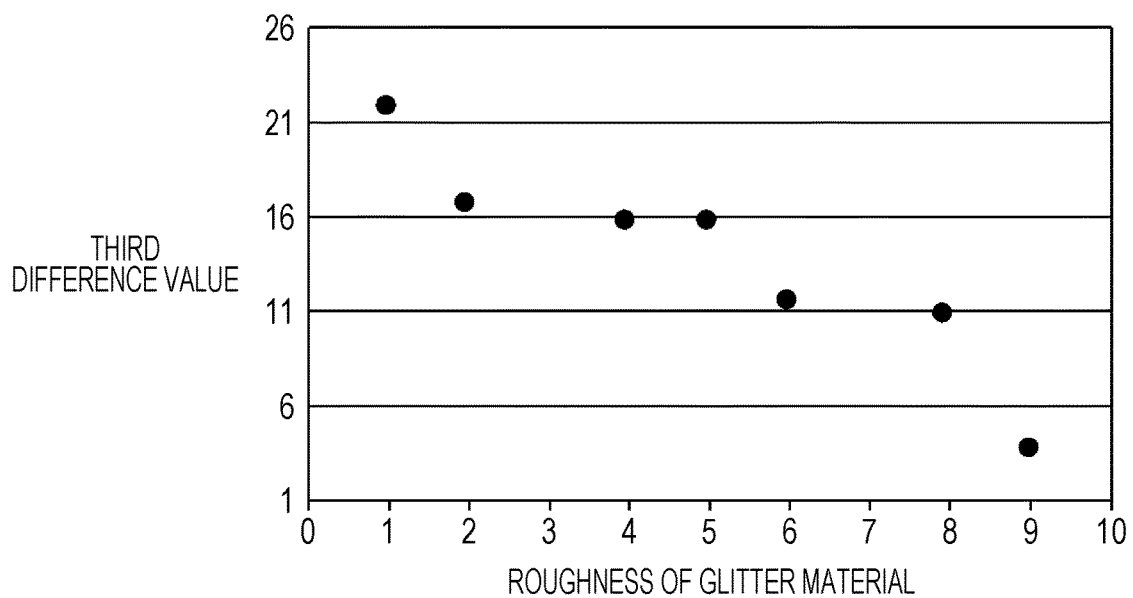
FIG. 23 is a graph illustrating a relationship between a third difference value and roughness of a glitter material.

FIG. 23 is a graph illustrating a relationship between the third difference value and the roughness of the glitter material and corresponds to FIG. 15. The third difference value in the case of the roughness of 1 indicates the third difference value calculated by using the data indicated by "1" of FIG. 22 (the data in the case of the sample of the roughness of 1). Similarly, the third difference values in the case of the roughness of 2, the roughness of 4, the roughness of 5, the roughness of 6, the roughness of 8, and the roughness of 9 respectively indicate the third difference values calculated by using the data indicated by "2" of FIG. 22 (the data in the case of the sample of the roughness of 2), the data indicated by "4" (the data in the case of the sample of the roughness of 4), the data indicated by "5" (the data in the case of the sample of the roughness of 5), the data indicated by "6" (the data in the case of the sample of the roughness of 6), the data indicated by "8" (the data in the case of the sample of the roughness of 8), and the data indicated by "9" (the data in the case of the sample of the roughness of 9).

It was understood that the third difference value tended to decrease as the index value (here, the roughness) increased. Thus, it was understood that the third difference value was correlated with the index value and these seven third difference values were data correlated with the index value.

As described in the first example and the second example, according to the multi-angle colorimeter 1 of the embodiment, it is possible to obtain the data (FIGS. 15 and 23) correlated with the roughness of the glitter material contained in the glitter material-containing coating film (the index value indicating physical characteristics of the glitter material) without using a camera.

Next, the calculation of the correlation equation and the calculation of the roughness of the glitter material contained in the glitter material-containing coating film will be described. The roughness of the glitter material is an example of the index value indicating physical characteristics of the glitter material included in the glitter material-containing coating film. As the data correlated with the roughness of the glitter material, the first example is used. As the data correlated with the roughness of the glitter material, the first difference value illustrated in FIG. 14 and the third difference value illustrated in FIG. 15 are known. A description will be made by using the first difference value as an example.

Referring to FIG. 1, the correlation equation calculator 58 calculates an approximate equation (a correlation equation) illustrating a relationship between the first difference value and the roughness of the glitter material by using, for example, a least squares method based on the data for the aspecular angle of −15° illustrated in FIG. 14 (the first difference value and the roughness of the glitter material). The correlation equation calculator 58 stores the calculated correlation equation in the storage 59. The correlation equation is an example of correlation information. The correlation information is information indicating a correlation between the roughness of the glitter material and the first difference value and capable of obtaining the index value from the first difference value. The correlation information is not limited to the correlation equation and may be a table indicating the correlation between the roughness of the glitter material and the first difference value.

In this way, a user of the multi-angle colorimeter 1 prepares a plurality of samples in which the roughness of the glitter material is different as the glitter material-containing coating film, calculates the data correlated with the roughness of the glitter material by using the multi-angle colorimeter 1, and calculates the correlation equation by using the data. However, the correlation equation obtained in advance may be stored in the storage 59 of the multi-angle colorimeter 1 (that is, the correlation equation is stored in the storage 59 of the multi-angle colorimeter 1 to be shipped from a factory). In this way, the user of the multi-angle colorimeter 1 may omit the effort for obtaining the correlation equation.

Figure 24:
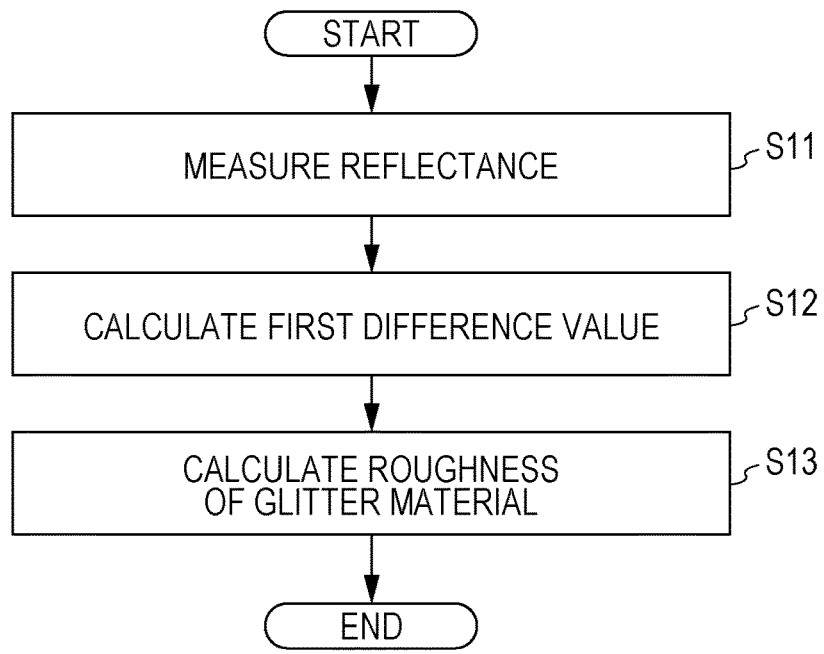
FIG. 24 is a flowchart describing a calculation of roughness of a glitter material contained in a glitter material-containing coating film using a first difference value.

The calculation of the roughness of the glitter material contained in the glitter material-containing coating film using the first difference value will be described. FIG. 24 is a flowchart using that calculation. The measurement part 10 measures the reflectance of the first wavelength component and the reflectance of the second wavelength component of the reflected light in the highlight direction for the glitter material-containing coating film corresponding to the measurement object (step S11). Here, the first wavelength component is set to the wavelength of 450 nm. The second wavelength component is set to the wavelength of 600 nm. The highlight direction is set to the aspecular angle of −15°.

The first calculator 56 calculates the first difference value which is the difference between the reflectance of the first wavelength component and the reflectance of the second wavelength component by using the result of step S11 (step S12).

The index value calculator 60 calculates the roughness of the glitter material contained in the glitter material-containing coating film corresponding to the measurement object by using the first difference value calculated in step S12 and the correlation equation stored in advance in the storage 59 (the correlation equation for the aspecular angle of −15° illustrated in FIG. 14) (step S13). Then, the control calculation unit 5 outputs the roughness of the glitter material calculated in step S13 to the output unit 9.

Next, a case of the third difference value illustrated in FIG. 15 will be described as the data correlated with the roughness of the glitter material. Referring to FIG. 1, the correlation equation calculator 58 calculates an approximate equation (a correlation equation) illustrating a relationship between the third difference value and the roughness of the glitter material illustrated in FIG. 15 by using, for example, a least squares method. The correlation equation calculator 58 stores the calculated correlation equation in the storage 59. The correlation equation is an example of the correlation information. The correlation information is information indicating a correlation between the roughness of the glitter material and the third difference value and capable of obtaining the index value from the third difference value. The correlation information is not limited to the correlation equation and may be a table indicating the correlation between the roughness of the glitter material and the third difference value.

Figure 25:
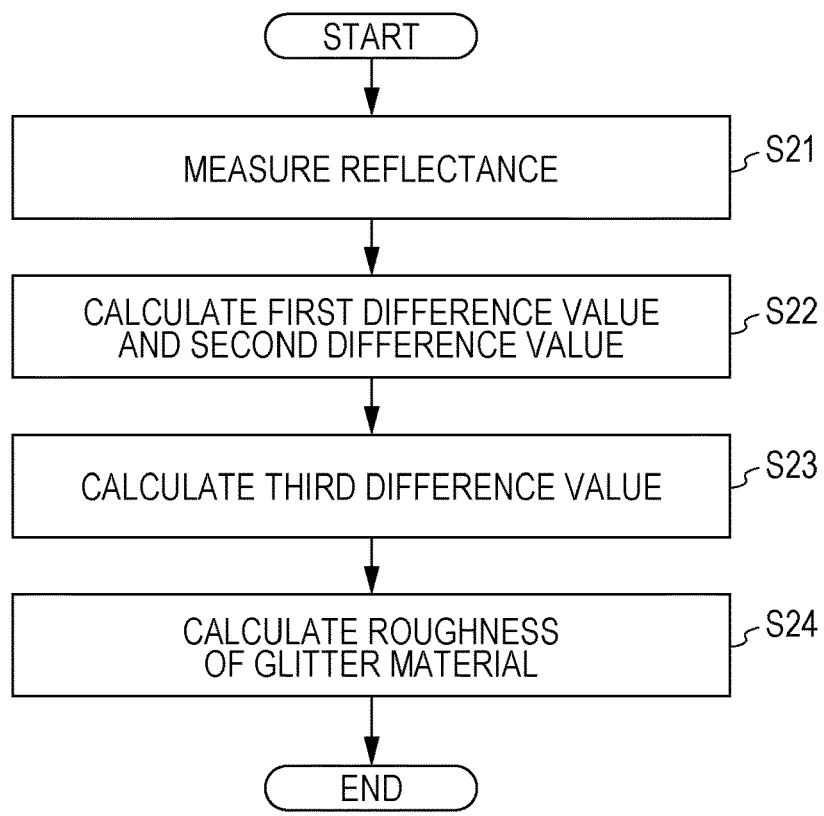
FIG. 25 is a flowchart describing a calculation of roughness of a glitter material contained in a glitter material-containing coating film using a third difference value.

The calculation of the roughness of the glitter material contained in the glitter material-containing coating film using the third difference value will be described. FIG. 25 is a flowchart using that calculation. The measurement part 10 measures the reflectance of the first wavelength component and the reflectance of the second wavelength component of the reflected light in the highlight direction for the glitter material-containing coating film corresponding to the measurement object and measures the reflectance of the first wavelength component and the reflectance of the second wavelength component of the reflected light in the shade direction (step S21). Here, the first wavelength component is set to the wavelength of 450 nm. The second wavelength component is set to the wavelength of 600 nm. The highlight direction is set to the aspecular angle of −15° or 15°. The shade direction is set to the aspecular angle of 75°.

The first calculator 56 calculates the first difference value and the second difference value by using the result of step S21 (step S22). Here, there are two first difference values. One value indicates a difference between the reflectance of the first wavelength component and the reflectance of the second wavelength component at the aspecular angle of −15°. The other value indicates a difference between the reflectance of the first wavelength component and the reflectance of the second wavelength component at the aspecular angle of 15°. The second difference value is a value indicating a difference between the reflectance of the first wavelength component and the reflectance of the second wavelength component at the aspecular angle of 75°.

The second calculator 57 calculates the third difference value by applying the result of step S22 to the equation of Math. 1 (step S23).

The index value calculator 60 calculates the roughness of the glitter material contained in the glitter material-containing coating film corresponding to the measurement object by using the third difference value calculated in step S23 and the correlation equation stored in the storage 59 in advance (the correlation equation illustrating a relationship between the third difference value and the roughness of the glitter material illustrated in FIG. 15) (step S24). Then, the control calculation unit 5 outputs the roughness of the glitter material calculated in step S24 to the output unit 9.

As described above, according to the multi-angle colorimeter 1 of the embodiment, it is possible to obtain the roughness of the glitter material contained in the glitter material-containing coating film (the index value indicating physical characteristics of the glitter material) without using a camera.

Summary of Embodiment

An optical analysis device according to a first aspect of the embodiment includes: a measurement part which sets a difference between a peak reflectance of a first wavelength component and a reflectance of a second wavelength component having a predetermined wavelength among reflectances of a plurality of wavelength components constituting reflected light in a highlight direction from a glitter material-containing coating film as a first difference value and measures the reflectance of the first wavelength component and the reflectance of the second wavelength component of the reflected light in the highlight direction for the glitter material-containing coating film corresponding to a measurement object; a first calculator which calculates the first difference value by using the measurement result of the measurement part; a storage which stores in advance correlation information illustrating a correlation between the first difference value and an index value indicating predetermined physical characteristics of a glitter material contained in the glitter material-containing coating film and capable of obtaining the index value from the first difference value; and an index value calculator which calculates the index value of the glitter material-containing coating film corresponding to the measurement object by using the first difference value calculated in the first calculator and the correlation information stored in advance in the storage.

The inventor has found that the first difference value is correlated with the index value indicating physical characteristics of the glitter material contained in the glitter material-containing coating film (for example, the roughness of the glitter material). The correlation information is information indicating the correlation between the index value and the first difference value and capable of obtaining the index value from the first difference value. The correlation information is stored in the storage in advance. The index value calculator calculates the index value for the glitter material-containing coating film corresponding to the measurement object by using the correlation information and the first difference value calculated for the glitter material-containing coating film corresponding to the measurement object. Thus, according to the optical analysis device of the first aspect of the embodiment, it is possible to obtain the index value indicating physical characteristics of the glitter material contained in the glitter material-containing coating film.

In the above-described configuration, the light receiving angle of the highlight direction is the aspecular angle of −15°. This is an example of the light receiving angle of the highlight direction.

An optical analysis device according to a second aspect of the embodiment achieving the above-described object includes: a measurement part which sets a difference between a peak reflectance of a first wavelength component and a reflectance of a second wavelength component having a predetermined wavelength among reflectances of a plurality of wavelength components constituting reflected light in a highlight direction from a glitter material-containing coating film as a first difference value, sets a difference between the reflectance of the first wavelength component and the reflectance of the second wavelength component among the reflectances of the plurality of wavelength components constituting the reflected light in a shade direction from the glitter material-containing coating film as a second difference value, sets a difference between a first value determined by using the first difference value and a second value determined by using the second difference value as a third difference value, measures the reflectance of the first wavelength component and the reflectance of the second wavelength component of the reflected light in the highlight direction for the glitter material-containing coating film corresponding to a measurement object, and measures the reflectance of the first wavelength component and the reflectance of the second wavelength component of the reflected light in the shade direction; a first calculator which calculates the first difference value and the second difference value by using the measurement result of the measurement part; a second calculator which calculates the third difference value corresponding to the difference between the first value determined by using the first difference value calculated by the first calculator and the second value determined by using the second difference value calculated by the first calculator; a storage which stores in advance correlation information indicating a correlation between the third difference value and an index value indicating predetermined physical characteristics of a glitter material contained in the glitter material-containing coating film and capable of obtaining the index value from the third difference value; and an index value calculator which calculates the index value of the glitter material-containing coating film corresponding to the measurement object by using the third difference value calculated by the second calculator and the correlation information stored in advance in the storage.

The data correlated with the index value is not limited to the first difference value. As another example of the data correlated with the index value, the third difference value is known.

The third difference value is a difference between the first value determined by using the first difference value and the second value determined by using the second difference value. The first value is, for example, an average value of the first difference value when the light receiving angle of the highlight direction is the first angle (for example, the aspecular angle of −15°) and the first difference value when the light receiving angle of the highlight direction is the second angle (for example, the aspecular angle of 15°). The second value is, for example, the second difference value when the light receiving angle of the shade direction is the third angle (for example, the aspecular angle of 75°).

According to the optical analysis device of the second aspect of the embodiment, it is possible to obtain the index value indicating physical characteristics of the glitter material contained in the glitter material-containing coating film due to the same reason as that of the optical analysis device according to the first aspect of the embodiment.

An optical analysis method according to a third aspect of the embodiment achieving the above-described object includes: a first step of setting a difference between a peak reflectance of a first wavelength component and a reflectance of a second wavelength component having a predetermined wavelength among reflectances of a plurality of wavelength components constituting reflected light in a highlight direction from a glitter material-containing coating film as a first difference value and measuring the reflectance of the first wavelength component and the reflectance of the second wavelength component of the reflected light in the highlight direction for the glitter material-containing coating film corresponding to a measurement object; a second step of calculating the first difference value by using the measurement result of the first step; and a third step of setting information illustrating a correlation between the first difference value and an index value indicating predetermined physical characteristics of a glitter material contained in the glitter material-containing coating film and capable of obtaining the index value from the first difference value as correlation information and calculating the index value of the glitter material-containing coating film corresponding to the measurement object by using the correlation information and the first difference value calculated in the second step.

The optical analysis method according to the third aspect of the embodiment defines the optical analysis device according to the first aspect of the embodiment from the viewpoint of a method and has the same operations and effects as those of the optical analysis device according to the first aspect of the embodiment.

An optical analysis method according to a fourth aspect of the embodiment achieving the above-described object includes: a first step of setting a difference between a peak reflectance of a first wavelength component and a reflectance of a second wavelength component having a predetermined wavelength among reflectances of a plurality of wavelength components constituting reflected light in a highlight direction from a glitter material-containing coating film as a first difference value, setting a difference between the reflectance of the first wavelength component and the reflectance of the second wavelength component among the reflectances of the plurality of wavelength components constituting the reflected light in a shade direction from the glitter material-containing coating film as a second difference value, setting a difference between a first value determined by using the first difference value and a second value determined by using the second difference value as a third difference value, measuring the reflectance of the first wavelength component and the reflectance of the second wavelength component of the reflected light in the highlight direction for the glitter material-containing coating film corresponding to a measurement object, and measuring the reflectance of the first wavelength component and the reflectance of the second wavelength component of the reflected light in the shade direction; a second step of calculating the first difference value and the second difference value by using the measurement result of the first step; a third step of calculating the third difference value which is the difference between the first value determined by using the first difference value calculated in the second step and the second value determined by using the second difference value calculated in the second step; and a fourth step of setting information indicating a correlation between the third difference value and an index value indicating predetermined physical characteristics of a glitter material contained in the glitter material-containing coating film and capable of obtaining the index value from the third difference value as correlation information and calculating the index value of the glitter material-containing coating film corresponding to the measurement object by using the correlation information and the third difference value calculated in the third step.

The optical analysis method according to the fourth aspect of the embodiment defines the optical analysis device according to the second aspect of the embodiment from the viewpoint of a method and has the same operations and effects as those of the optical analysis device according to the second aspect of the embodiment.

This application is based on Japanese Patent Application No. 2016-088732 filed on Apr. 27, 2016, the contents of which are included in the present application.

The invention has been described appropriately and sufficiently in terms of the embodiment with reference to the drawings in order to express the invention, but it should be recognized that the above-described embodiment can be easily modified and/or improved by the person skilled in the art. Thus, it is interpreted that the modification or improvement performed by the person skilled in the art is included in the scope of claims as long as the modification or improvement does not deviate from the scope of claims.

INDUSTRIAL APPLICABILITY

According to the invention, the optical analysis device and the optical analysis method can be provided.

The invention claimed is:
1. An optical analysis device comprising:
a measurement part which measures a peak reflectance of a first wavelength component and a reflectance of a second wavelength component of a reflected light in a highlight direction for a glitter material-containing coating film corresponding to a measurement object;
a first calculator which calculates a first difference value, as a difference between the peak reflectance of the first wavelength component and the reflectance of the second wavelength component having a predetermined wavelength among reflectances of a plurality of wavelength components constituting the reflected light in a highlight direction from the glitter material-containing coating film, by using the measurement result of the measurement part;
a storage which stores in advance correlation information illustrating a correlation between the first difference value and an index value indicating predetermined physical characteristics of a glitter material contained in the glitter material-containing coating film; and an index value calculator which calculates the index value of the glitter material-containing coating film corresponding to the measurement object by using the first difference value calculated in the first calculator and the correlation information stored in advance in the storage.

2. The optical analysis device according to claim 1, wherein a light receiving angle of the highlight direction is an aspecular angle of −15°.

3. The optical analysis device according to claim 2, wherein the index value indicating the physical characteristics is roughness of the glitter material.

4. The optical analysis device according to claim 1, wherein the index value indicating the physical characteristics is roughness of the glitter material.

5. An optical analysis device comprising:
a measurement part which measures a peak reflectance of a first wavelength component and a reflectance of a second wavelength component of a reflected light in a highlight direction for a glitter material-containing coating film corresponding to a measurement object, and measures the peak reflectance of the first wavelength component and the reflectance of the second wavelength component of the reflected light in a shade direction;
a first calculator which calculates a first difference value, as a difference between the peak reflectance of the first wavelength component and the reflectance of the second wavelength component having a predetermined wavelength among reflectances of a plurality of wavelength components constituting the reflected light in the highlight direction from the glitter material-containing coating film, and a second difference value, as a difference between the peak reflectance of the first wavelength component and the reflectance of the second wavelength component among the reflectances of the plurality of wavelength components constituting the reflected light in the shade direction from the glitter material-containing coating film, by using the measurement result of the measurement part;
a second calculator which calculates a third difference value corresponding to a difference between a first value determined by using the first difference value calculated by the first calculator and the second value determined by using the second difference value calculated by the first calculator;
a storage which stores in advance correlation information indicating a correlation between the third difference value and an index value indicating predetermined physical characteristics of a glitter material contained in the glitter material-containing coating film; and
an index value calculator which calculates the index value of the glitter material-containing coating film corresponding to the measurement object by using the third difference value calculated by the second calculator and the correlation information stored in advance in the storage.

6. The optical analysis device according to claim 5, wherein the first value is an average value of the first difference value when a light receiving angle in the highlight direction is a first angle and the first difference value when the light receiving angle in the highlight direction is a second angle and the second value is the second difference value when a light receiving angle in the shade direction is a third angle.

7. The optical analysis device according to claim 6, wherein the first angle is an aspecular angle of −15°, the second angle is an aspecular angle of 15°, and the third angle is an aspecular angle of 75°.

8. The optical analysis device according to claim 7, wherein the index value indicating the physical characteristics is roughness of the glitter material.

9. The optical analysis device according to claim 6, wherein the index value indicating the physical characteristics is roughness of the glitter material.

10. The optical analysis device according to claim 5, wherein the index value indicating the physical characteristics is roughness of the glitter material.

11. An optical analysis method comprising:
measuring a peak reflectance of a first wavelength component and a reflectance of a second wavelength component of a reflected light in a highlight direction for a glitter material-containing coating film corresponding to a measurement object;
calculating a first difference value, as a difference between the peak reflectance of the first wavelength component and the reflectance of the second wavelength component having a predetermined wavelength among reflectances of a plurality of wavelength components constituting the reflected light in the highlight direction from the glitter material-containing coating film, by using the measurement result of the measuring; and
calculating an index value, indicating predetermined physical characteristics of a glitter material contained in the glitter material-containing coating film, of the glitter material-containing coating film corresponding to the measurement object by using a correlation information illustrating a correlation between the calculated first difference value and the calculated index value.

12. An optical analysis method comprising:
measuring a peak reflectance of a first wavelength component and a reflectance of a second wavelength component of a reflected light in a highlight direction for a glitter material-containing coating film corresponding to a measurement object, and measuring the peak reflectance of the first wavelength component and the reflectance of the second wavelength component of the reflected light in a shade direction;
calculating a first difference value, as a difference between the peak reflectance of the first wavelength component and the reflectance of a second wavelength component having a predetermined wavelength among reflectances of a plurality of wavelength components constituting the reflected light in the highlight direction from the glitter material-containing coating film, and a second difference value, as a difference between the peak reflectance of the first wavelength component and the reflectance of the second wavelength component among the reflectances of the plurality of wavelength components constituting the reflected light in the shade direction from the glitter material-containing coating film, by using the measurement result of the measuring;
calculating a third difference value corresponding to a difference between the first value determined by using the calculated first difference value and the second value determined by using the calculated second difference value; and
calculating an index value, indicating predetermined physical characteristics of the glitter material contained in the glitter material-containing coating film, of the glitter material-containing coating film corresponding to the measurement object by using a correlation information indicating a correlation between the third difference value and the index value and the calculated third difference value.

* * * * *